United States Patent
Noh et al.

(10) Patent No.: US 10,624,130 B2
(45) Date of Patent: Apr. 14, 2020

(54) METHOD, APPARATUS, AND SYSTEM FOR CHANNEL ACCESS IN UNLICENSED BAND

(71) Applicant: WILUS INSTITUTE OF STANDARDS AND TECHNOLOGY INC., Gyeonggi-do (KR)

(72) Inventors: Minseok Noh, Seoul (KR); Jinsam Kwak, Gyeonggi-do (KR); Juhyung Son, Gyeonggi-do (KR)

(73) Assignee: WILUS INSTITUTE OF STANDARDS AND TECHNOLOGY, Gyeonggi-Do (KR)

( * ) Notice: Subject to any disclaimer, the term of this patent is extended or adjusted under 35 U.S.C. 154(b) by 0 days.

(21) Appl. No.: 16/013,918

(22) Filed: Jun. 20, 2018

(65) Prior Publication Data

US 2018/0302927 A1    Oct. 18, 2018

Related U.S. Application Data

(63) Continuation of application No. PCT/KR2016/013814, filed on Nov. 28, 2016.

(30) Foreign Application Priority Data

Dec. 24, 2015 (KR) .................. 10-2015-0186870
Jan. 25, 2016 (KR) .................. 10-2016-0008636
Apr. 2, 2016 (KR) .................. 10-2016-0040558

(51) Int. Cl.
*H04W 74/08* (2009.01)
*H04L 27/26* (2006.01)
(Continued)

(52) U.S. Cl.
CPC ..... *H04W 74/0816* (2013.01); *H04L 27/0006* (2013.01); *H04L 27/26* (2013.01);
(Continued)

(58) Field of Classification Search
CPC .................. H04L 5/0039; H04W 74/0816
See application file for complete search history.

(56) References Cited

U.S. PATENT DOCUMENTS

| | | | |
|---|---|---|---|
| 2002/0154653 A1* | 10/2002 | Benveniste | ......... H04L 12/4013 370/447 |
| 2002/0163933 A1* | 11/2002 | Benveniste | ............. H04L 47/10 370/465 |

(Continued)

FOREIGN PATENT DOCUMENTS

| | | |
|---|---|---|
| WO | 2014/027847 | 2/2014 |
| WO | 2014/088175 | 6/2014 |

(Continued)

OTHER PUBLICATIONS

International Search Report for PCT/KR2016/013814 dated Mar. 2, 2017 and its English translation from WIPO (published as WO 2017/111331).

(Continued)

*Primary Examiner* — Melanie Jagannathan
(74) *Attorney, Agent, or Firm* — Ladas & Parry, LLP

(57) ABSTRACT

A base station and terminal in a wireless communication system is disclosed. Each of the base station and the terminal of the wireless communication system includes a communication module and a processor. The processor is configured to determine whether a channel is idle during a defer duration, determine whether the channel is idle during a random backoff time interval determined based on an initial value of a counter and a slot duration that is a constant time unit when the channel is idle during the defer duration, wherein the initial value of the counter is determined based on a random value, and perform a transmission when the channel is idle during the random backoff time interval. The random number is obtained with a uniform probability (Continued)

within a contention window that is an integer set by the base station.

12 Claims, 24 Drawing Sheets

(51) Int. Cl.
  *H04L 27/00* (2006.01)
  *H04W 72/12* (2009.01)
  *H04W 72/04* (2009.01)

(52) U.S. Cl.
  CPC ... *H04W 72/1221* (2013.01); *H04W 72/1242* (2013.01); *H04W 74/0808* (2013.01); *H04L 27/2601* (2013.01); *H04W 72/0413* (2013.01); *H04W 72/0446* (2013.01)

(56) References Cited

U.S. PATENT DOCUMENTS

| | | | |
|---|---|---|---|
| 2014/0169290 A1* | 6/2014 | Seok | H04W 4/70 370/329 |
| 2015/0057011 A1 | 2/2015 | Di Girolamo et al. | |
| 2015/0327297 A1 | 11/2015 | Nilsson et al. | |
| 2016/0143014 A1* | 5/2016 | Mukherjee | H04W 74/0816 370/330 |
| 2017/0005768 A1* | 1/2017 | Yin | H04L 5/0055 |
| 2017/0019909 A1* | 1/2017 | Si | H04L 47/27 |
| 2017/0055296 A1* | 2/2017 | Cheng | H04W 74/0808 |
| 2018/0279367 A1* | 9/2018 | Han | H04W 74/0808 |

FOREIGN PATENT DOCUMENTS

| | | |
|---|---|---|
| WO | 2015/182969 | 12/2015 |
| WO | 2017/111331 | 6/2017 |

OTHER PUBLICATIONS

Written Opinion of the International Searching Authority for PCT/KR2016/013814 dated Mar. 2, 2017 and its English machine translation by Google Translate (published as WO 2017/111331).

* cited by examiner

METHOD, APPARATUS, AND SYSTEM FOR CHANNEL ACCESS IN UNLICENSED BAND

CROSS-REFERENCE TO RELATED APPLICATIONS

This application is a continuation of International Patent Application No. PCT/KR2016/013814 filed on Nov. 28, 2016, which claims the priority to Korean Patent Application No. 10-2015-0186870 filed in the Korean Intellectual Property Office on Dec. 24, 2015, Korean Patent Application No. 10-2016-0008636 filed in the Korean Intellectual Property Office on Jan. 25, 2016, and Korean Patent Application No. 10-2016-0040558 filed in the Korean Intellectual Property Office on Apr. 2, 2016, the entire contents of which are incorporated herein by reference.

TECHNICAL FIELD

The present invention relates to a wireless communication system. Specifically, the present invention relates to a method, apparatus, and system for accessing a channel in an unlicensed band.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

It is an object of the present invention to provide a method and apparatus for efficiently transmitting a signal in a wireless communication system, in particular, a cellular wireless communication system. It is another object of the present invention to provide a method and apparatus for efficiently transmitting a signal in a specific frequency band (e.g., unlicensed band). In particular, it is an object of the present invention to provide a method and apparatus for efficiently sharing a channel, and sensing and detecting a channel in a specific frequency band.

The technical object of the present invention is not limited to the above technical objects, and other technical problems that are not mentioned will be apparent to those skilled in the art from the following description.

Technical Solution

According to an embodiment of the present invention, a base station of a wireless communication system includes: a communication module; and a processor, wherein the processor is configured to determine whether a channel is idle during a defer duration, determine whether the channel is idle during a random backoff time interval determined based on an initial value of a counter and a slot duration that is a constant time unit when the channel is idle during the defer duration, wherein the initial value of the counter is determined based on a random value, and perform a transmission when the channel is idle during the random backoff time interval, wherein the random number is obtained with a uniform probability within a contention window that is an integer set by the base station.

The processor may be configured to perform a counter decrementing operation including decrementing a value of the counter by 1 in the random backoff time interval and to determining whether the channel is idle during one slot duration, determine whether the value of the counter is 0 when the channel is idle during the one slot duration, perform the transmission when the value of the counter is 0, and repeat the counter decrementing operation until the value of the counter reaches 0 when the value of the counter is not 0.

When the initial value of the counter is 0, the processor may be configured to access the channel without sensing whether the channel is idle during the one slot duration after the defer duration.

The processor is configured to determine whether the initial value of the counter is 0 at the end of the defer duration, and access the channel when the initial value of the counter is 0.

In the counter decrementing operation, when the channel is not idle during the one slot duration, the processor may be configured to determine whether the channel is idle during an additional defer duration having the same duration as the defer duration.

The processor may be configured to determine whether the value of the counter is 0 when channel is idle during the additional defer duration, after the additional defer duration, perform the transmission without sensing whether the channel is idle during the one slot duration when the value of the counter is 0.

When the channel is idle during the additional defer duration, the processor may be configured to determine whether the value of the counter is 0 at the end of the additional defer duration, and perform the transmission when the value of the counter is 0.

The processor may be configured to sense whether the channel is idle by the slot duration unit in the additional defer duration.

When the channel is busy during any one of a plurality of slot durations included in the additional defer duration, the processor may be configured to determine whether the channel is idle during the additional defer duration from the end of the slot duration determined to be busy.

The processor may be configured to selectively decrement the value of the counter by 1 during the counter decrementing operation.

The processor may be configured to determine the initial value of the counter to be a value larger than the random number.

The processor may be configured to determine the initial value of the counter to be a value larger by 1 than the random number.

The defer duration may be determined based on a channel access priority class of traffic included in a data channel to be transmitted through the transmission.

According to another embodiment of the present invention, an operating method of a wireless communication system includes: determining whether a channel is idle during a defer period, determining whether the channel is idle during a random backoff time interval determined based on an initial value of a counter and a slot duration that is a constant time unit when the channel is idle during the defer duration, wherein the initial value of the counter is determined based on a random value, and performing a transmission when the channel is idle during the random backoff time interval, wherein the random number is obtained with a uniform probability within a contention window that is an integer set by the base station.

According to another embodiment of the present invention, a user equipment of a wireless communication system includes: a communication module; and a processor, wherein the processor is configured to determine whether a channel is idle during a defer duration, determine whether the channel is idle during a random backoff time interval determined based on an initial value of a counter and a slot duration that is a constant time unit when the channel is idle during the defer duration, wherein the initial value of the counter is determined based on a random value, and perform a transmission when the channel is idle during the random backoff time interval, wherein the random number is obtained with a uniform probability within a contention window that is an integer set by the user equipment.

The processor may be configured to perform a counter decrementing operation including decrementing a value of the counter by 1 in the random backoff time interval and determining whether the channel is idle during one slot duration, determine whether the value of the counter is 0 when the channel is idle during the one slot duration, perform the transmission when the value of the counter is 0, and repeat the counter decrementing operation until the value of the counter reaches 0 when the value of the counter is not 0.

When the initial value of the counter is 0, the processor may be configured to perform the transmission without sensing whether the channel is idle during the one slot duration after the defer duration.

In the counter decrementing operation, when the channel is not idle during the one slot duration, the processor may be configured to determine whether the channel is idle during an additional defer duration having the same duration as the defer duration, and after the additional defer duration, when the value of the counter is 0, perform the transmission without sensing whether the channel is idle during the one slot duration.

The processor may be configured to sense whether the channel is idle by the slot duration unit in the additional defer duration.

Advantageous Effects

A wireless communication system, in particular, a cellular wireless communication system according to an embodiment of the present invention provides a method and apparatus for efficiently transmitting a signal. In addition, a wireless communication system according to an embodiment of the present invention provides a method and apparatus for efficiently transmitting a signal in a specific frequency band (e.g., unlicensed band). Also, a wireless communication system according to an embodiment of the present invention provides a method and apparatus for efficiently accessing a channel in a specific frequency band (e.g., unlicensed band).

Effects obtainable from various embodiments of the present disclosure are not limited to the above-mentioned effects, and other effects not mentioned above may be clearly derived and understood to those skilled in the art from the following description.

MODE FOR CARRYING OUT THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11(Wi-Fi), IEEE 802.16 (WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

This application claims priority to and the benefit of Korean Patent Application Nos. 10-2015-0186870 (2015.12.24), Nos. 10-2016-0008636 (2016.01.25), and Nos. 10-2016-0040558 (2016.04.02) filed in the Korean Intellectual Property Office and the embodiments and mentioned items described in the respective applications are included in the Detailed Description of the present application.

Figure 1:
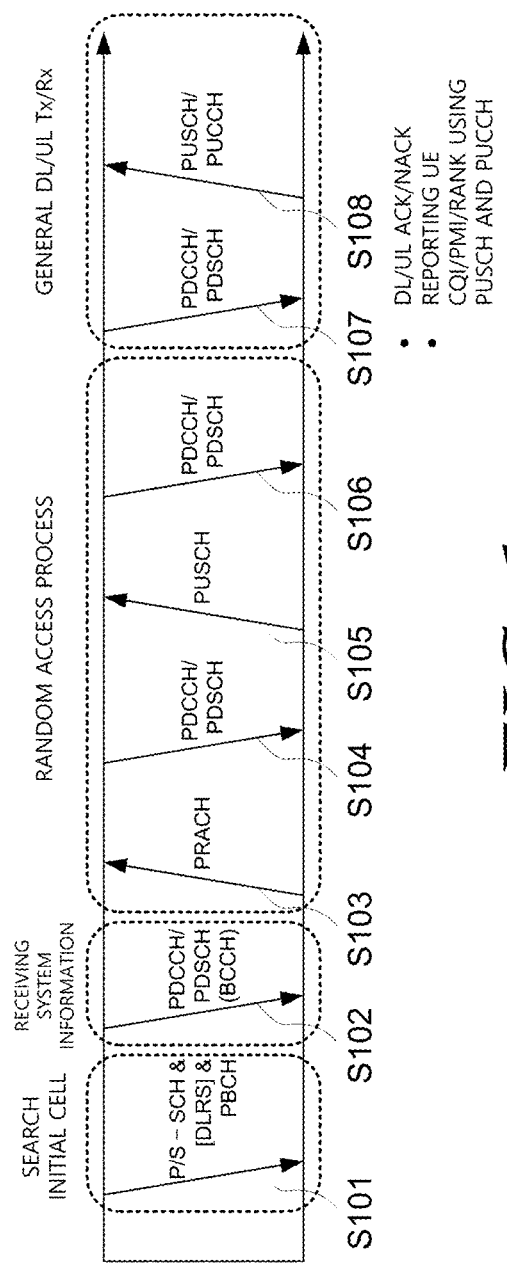
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. A user equipment receives information from a base station through downlink (DL) and the user equipment transmits information through uplink (UL) to the base station. The information transmitted/received between the base station and the user equipment includes data and various control channel and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S101). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S102).

When there is no radio resource for initially accessing the base station or signal transmission, the user equipment may perform a random access procedure (RACH procedure) to the base station (S103 to S106). Firstly, the user equipment may transmit a preamble through a physical random access channel (PRACH) (S103) and receive a response message to the preamble through the PDCCH and the PDSCH corresponding thereto (S104). When the user equipment receive a valid response message to random access, the user equipment may transmit data including an identifier of the user equipment to the base station by using the uplink (UL) grant (S105). To resolve a contention resolution, the user equipment may wait for receiving PDCCH as instruction of the base station. When the user equipment receive PDCCH by using the identifier of the user equipment (S016), random access procedure may end.

Thereafter, the user equipment may receive the PDCCH/PDSCH (S107) and transmit a physical uplink shared channel (PUSCH)/physical uplink control channel (PUCCH) (S108) as a general procedure. The user equipment receives downlink control information (DCI) through the control channel (PDCCH or E-PDCCH). The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
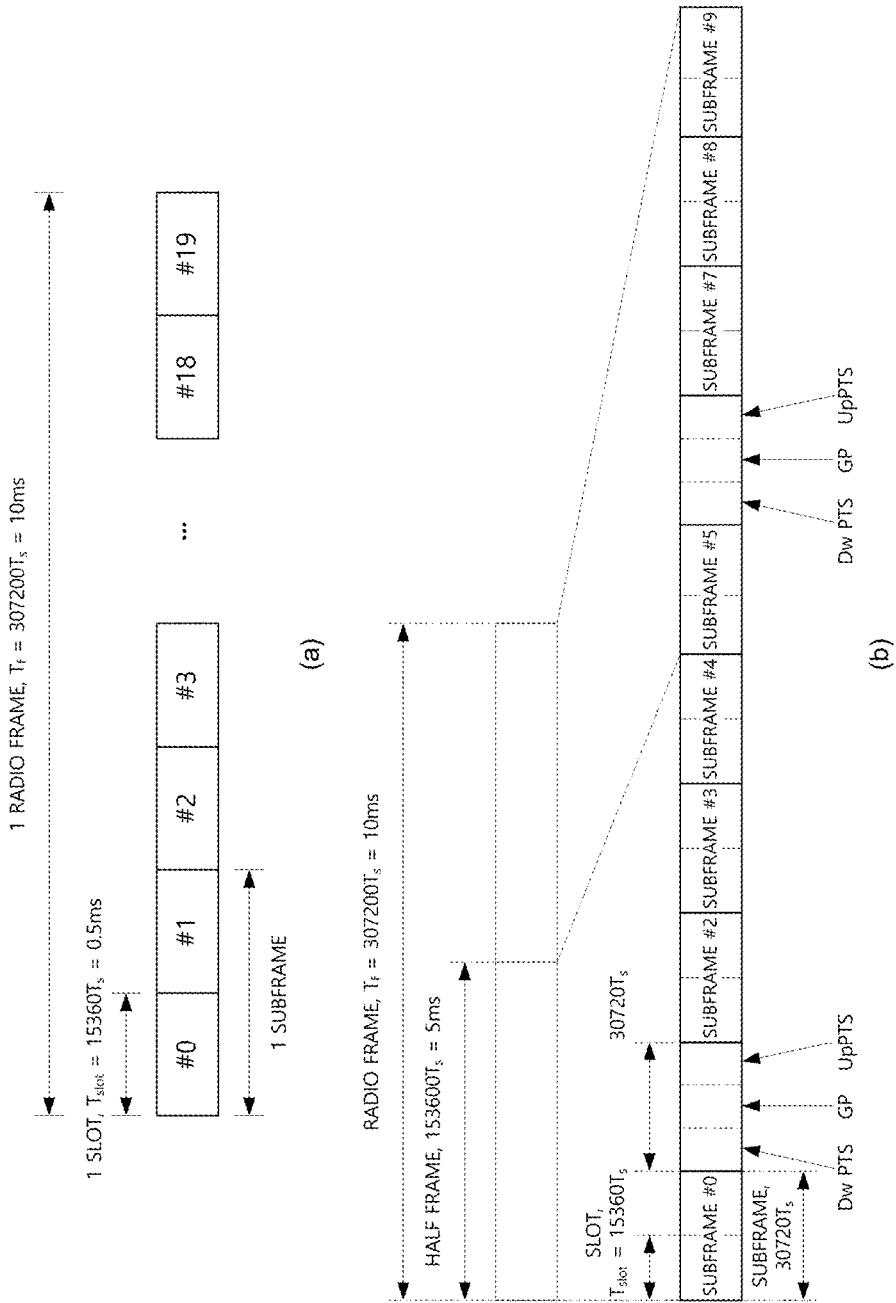
FIG. 2 illustrates one example of a radio frame structure used in a wireless communication system.

FIG. 2 illustrates one example of a radio frame structure used in a wireless communication system. FIG. 2A illustrates a frame structure for frequency division duplex (FDD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. 20 slots in one radio frame may be sequentially numbered from 0 to 19. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band. The TDD radio frame further includes special subframes for downlink and uplink switching. The special subframe includes a Downlink Pilot Time Slot (DwPTS), a guard period (GP), and an Uplink Pilot Time Slot (UpPTS).

Figure 3:
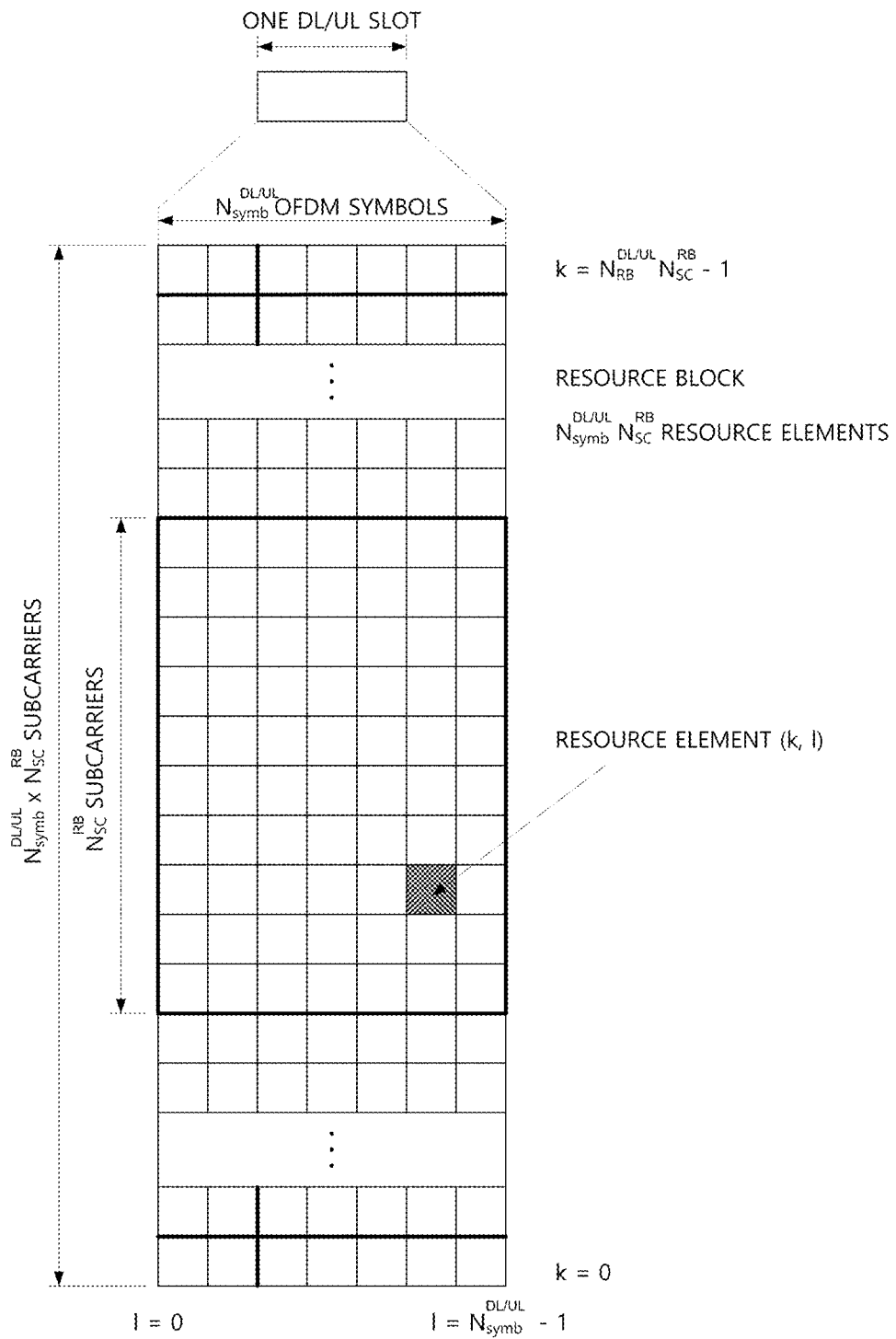
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriers in the frequency domain. A resource constituted by one OFDM symbol and one subcarrier is referred to as a resource element (RE) or a tone. One RB is constituted by $N^{DL/UL}_{symb}*N^{RB}_{sc}$ resource elements.

The resource of the slot may be expressed as a resource grid constituted by $N^{DL/UL}_{RB}*N^{RB}_{sc}$ subcarriers and $N^{DL/UL}_{symb}$ OFDM symbols. Each RE in the resource grid is uniquely defined by an index pair (k, 1) for each slot. k represents an index given with 0 to $N^{DL/UL}_{RB}*N^{RB}_{sc}-1$ in the frequency domain and 1 represents an index given with 0 to $N^{DL/UL}_{symb}-1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a DL transmission bandwidth and a UL transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
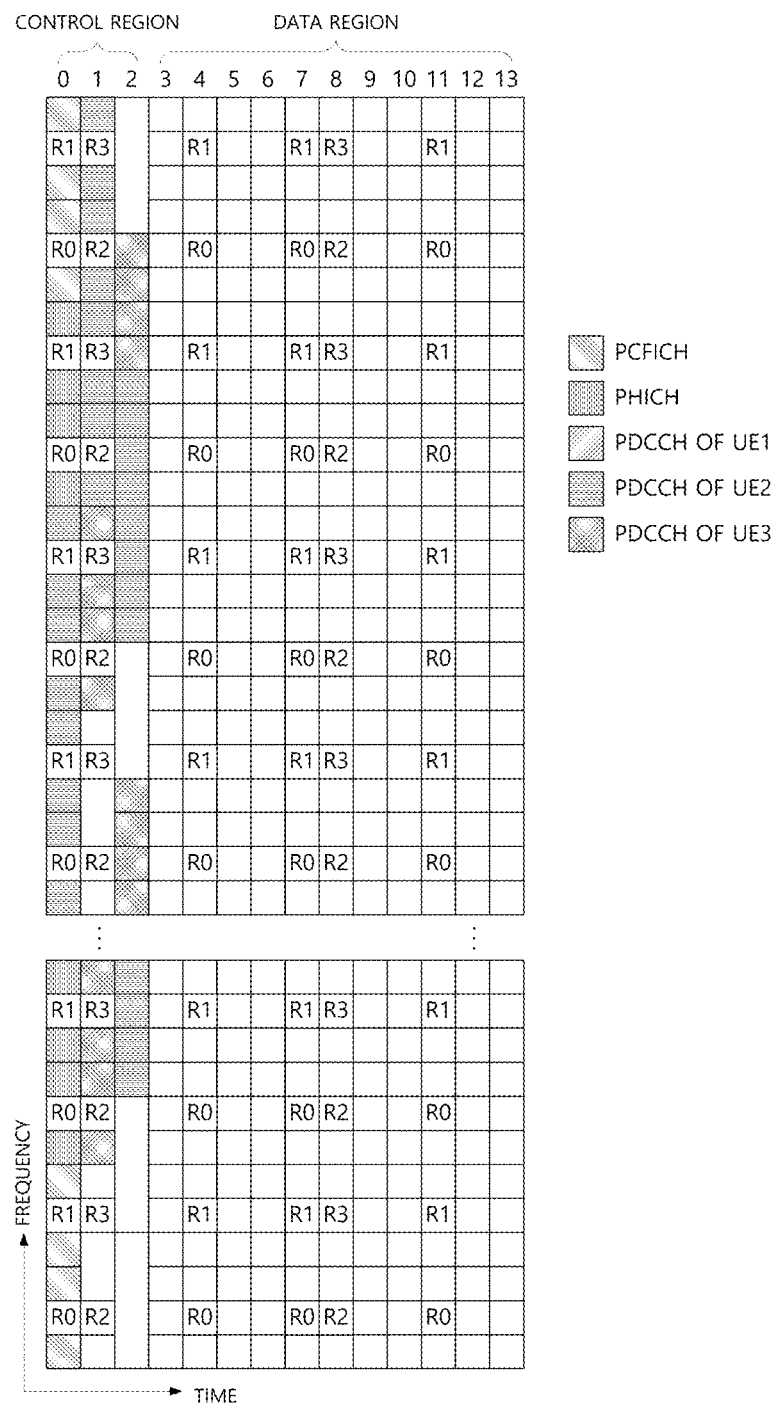
FIG. 4 illustrates a structure of a downlink subframe.

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1(alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell senses the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
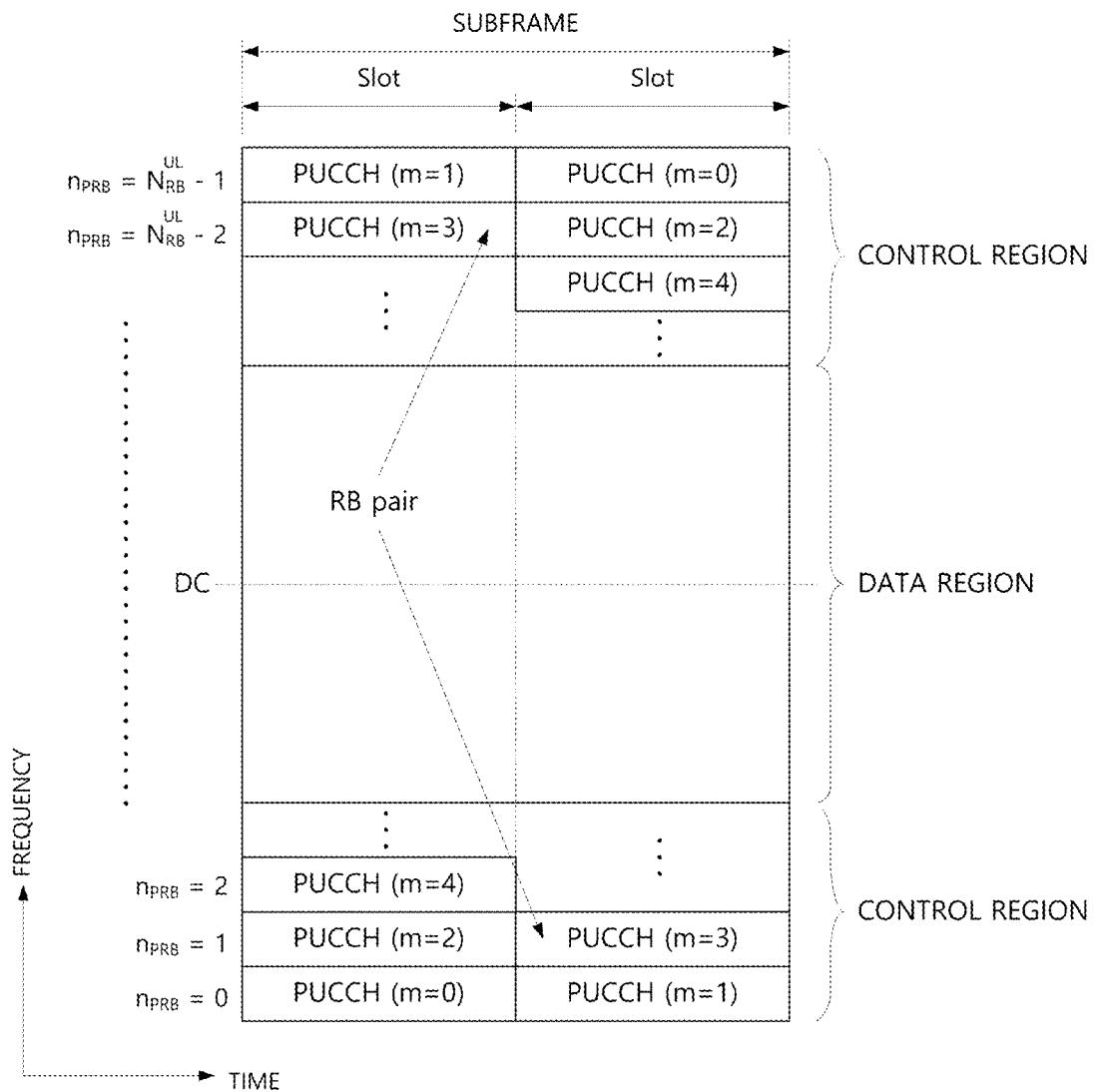
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel. Multiple input multiple output (MIMO) related feed-back information includes the RI and the PMI.

Table 1 shows the relationship between a PUCCH format and the UCI.

TABLE 1

| PUCCH Format | Uplink control information (UCI) |
|---|---|
| Format 1 | Scheduling request (SR) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1 or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
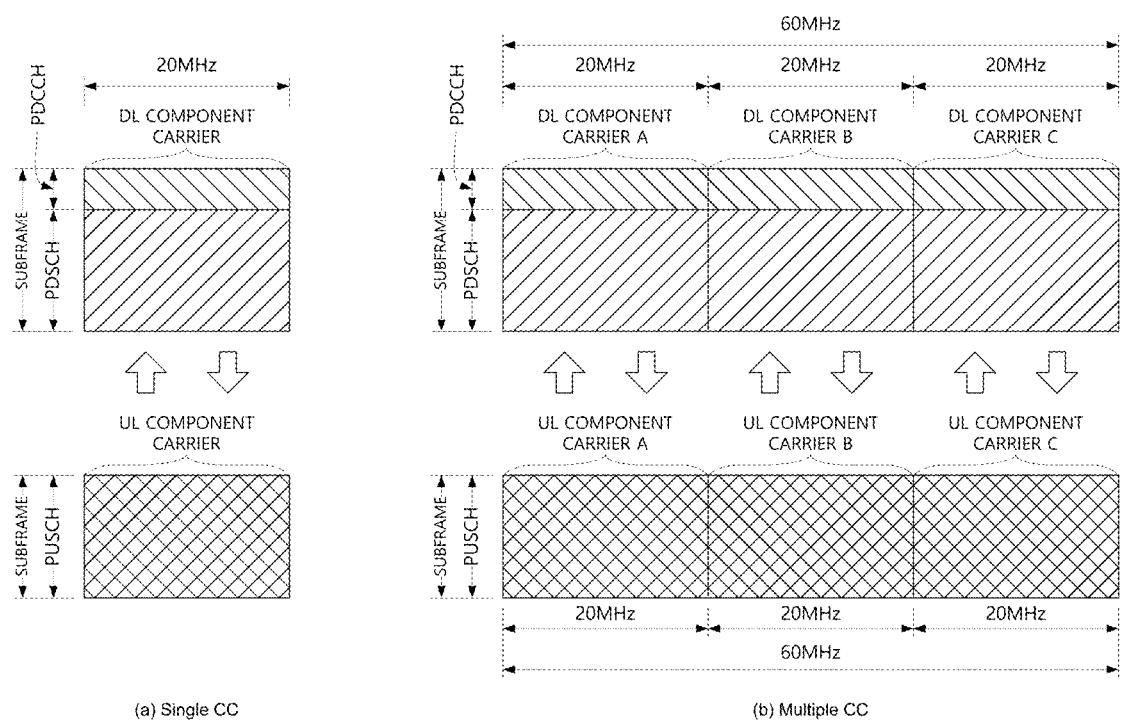
FIG. 6 is a diagram for describing single carrier communication and multi-carrier communication.

FIG. 6 is a diagram for describing single carrier communication and multi-carrier communication. FIG. 6(a) illustrates a subframe structure of a single carrier and FIG. 6(b) illustrates a subframe structure of multi-carriers which are carrier-aggregated.

Referring to FIG. 6(a), in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6(b), the carrier aggregation is distinguished from an OFDM system that performs DL/UL communication in a base frequency band divided into a plurality of subcarriers by using one carrier frequency, in that the carrier aggregation performs DL/UL communicationby using a plurality of carrier frequencies. Referring to FIG. 6(b), three 20 MHz CCs are gathered in each of the UL and the DL to support a bandwidth of 60 MHz. The CCs may be adjacent to each other or non-adjacent to each other in the frequency domain. For convenience, FIG. 6(b) illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
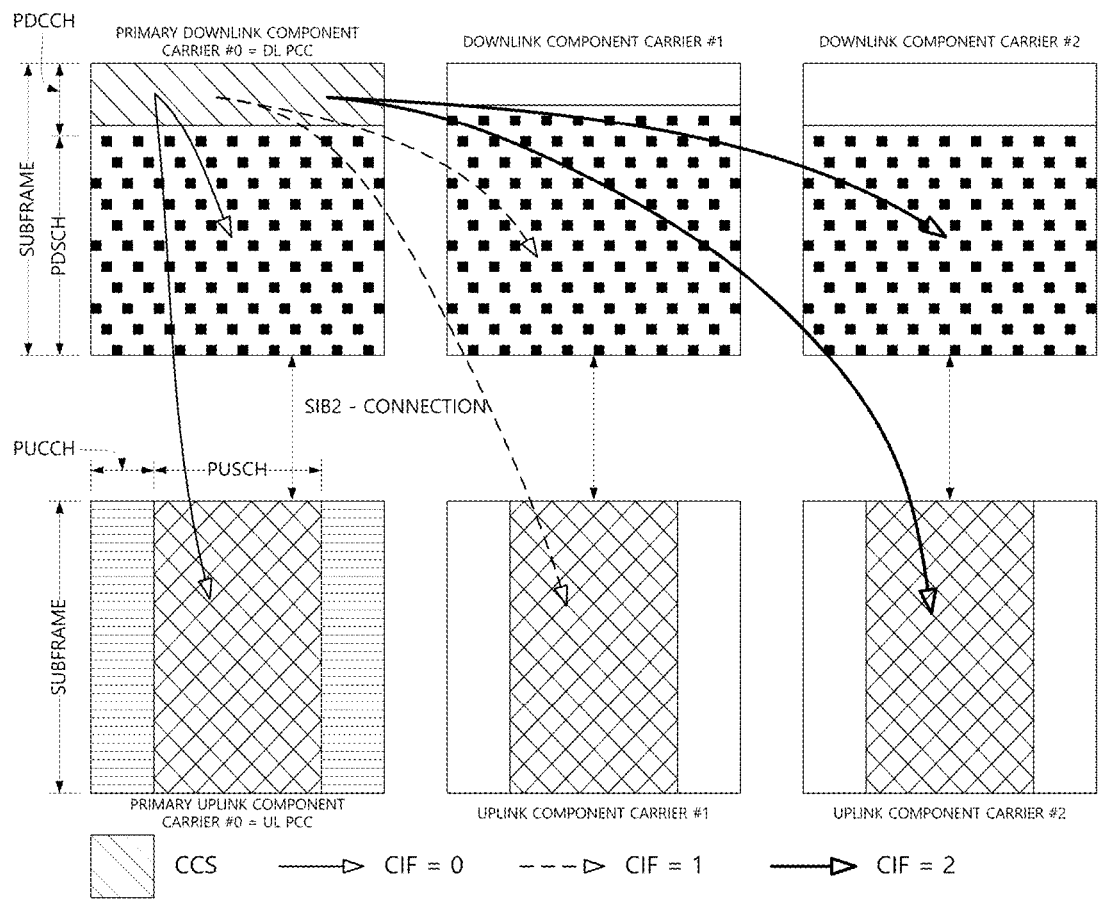
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an higher layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) higher layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
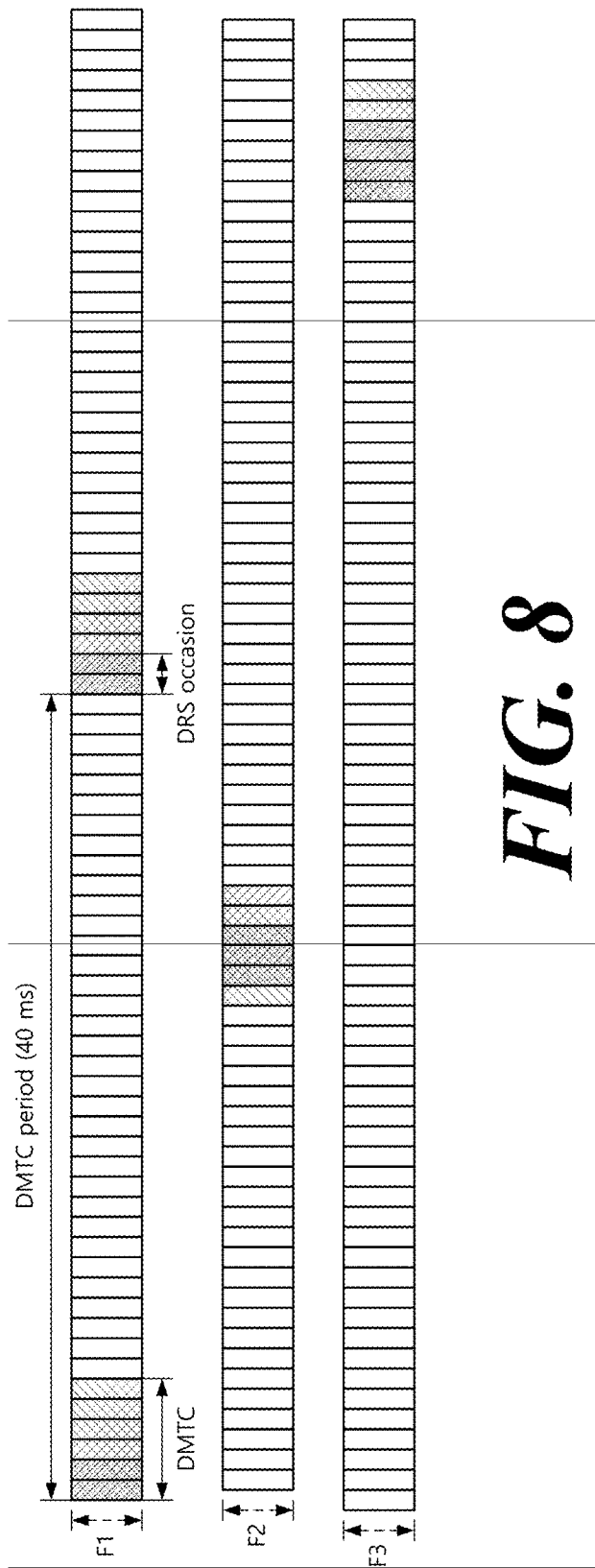
FIG. 8 illustrates Discovery Reference Signal (DRS) transmission.
Figure 9:
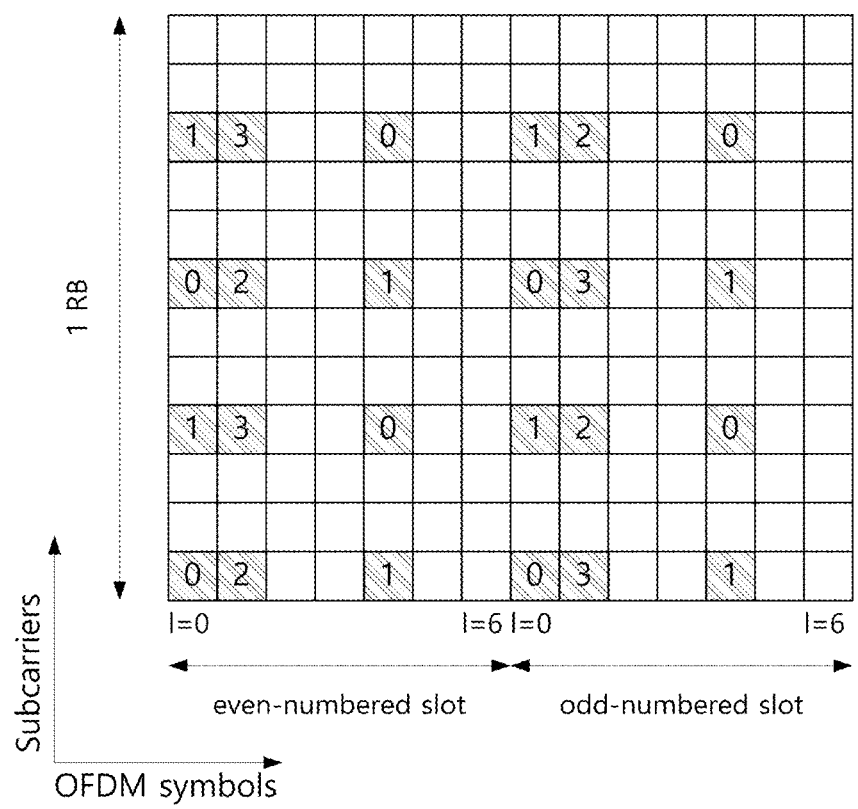
FIGS. 9 to 11 illustrate the structure of a reference signal used as DRS.
Figure 10:
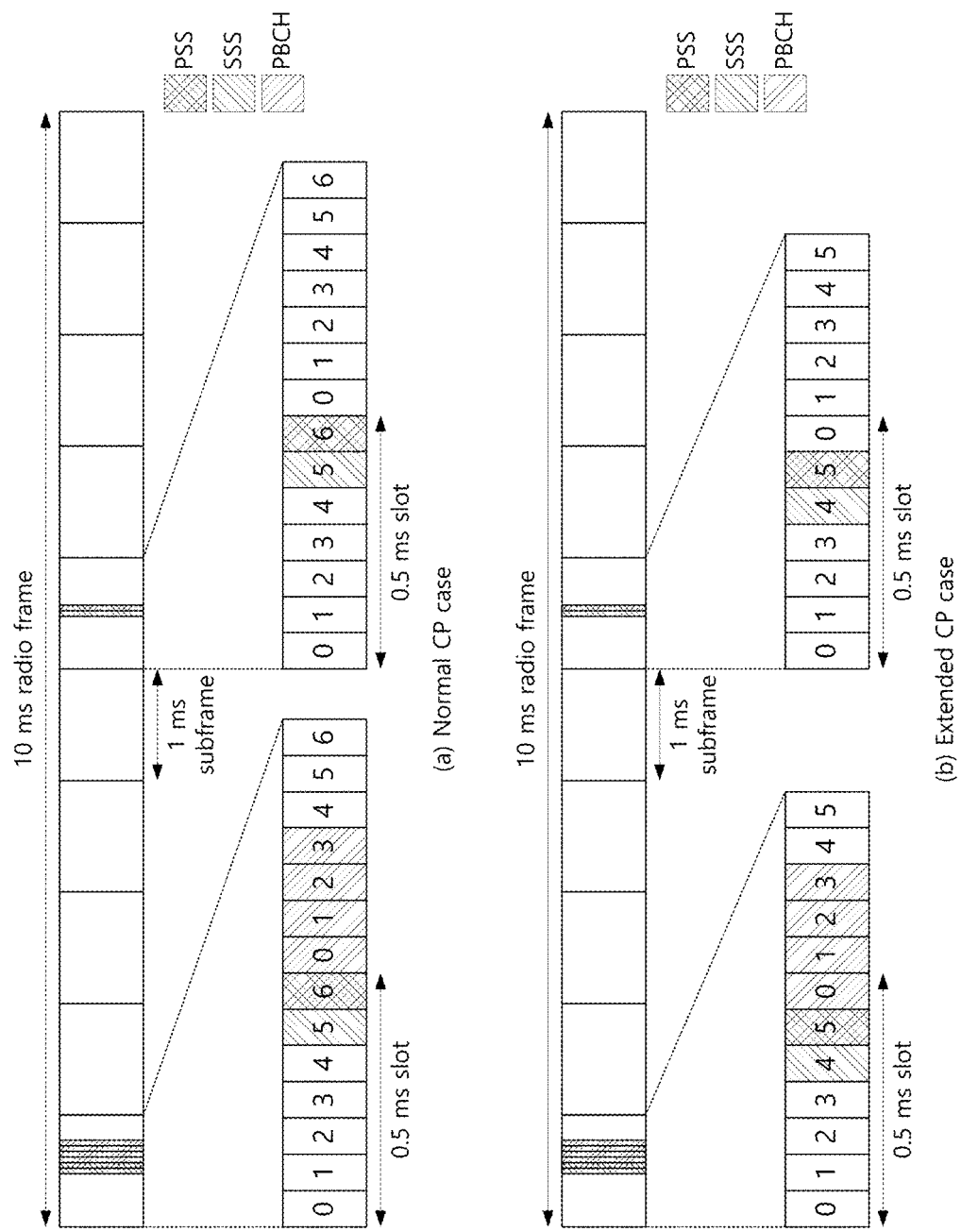
Figure 11:
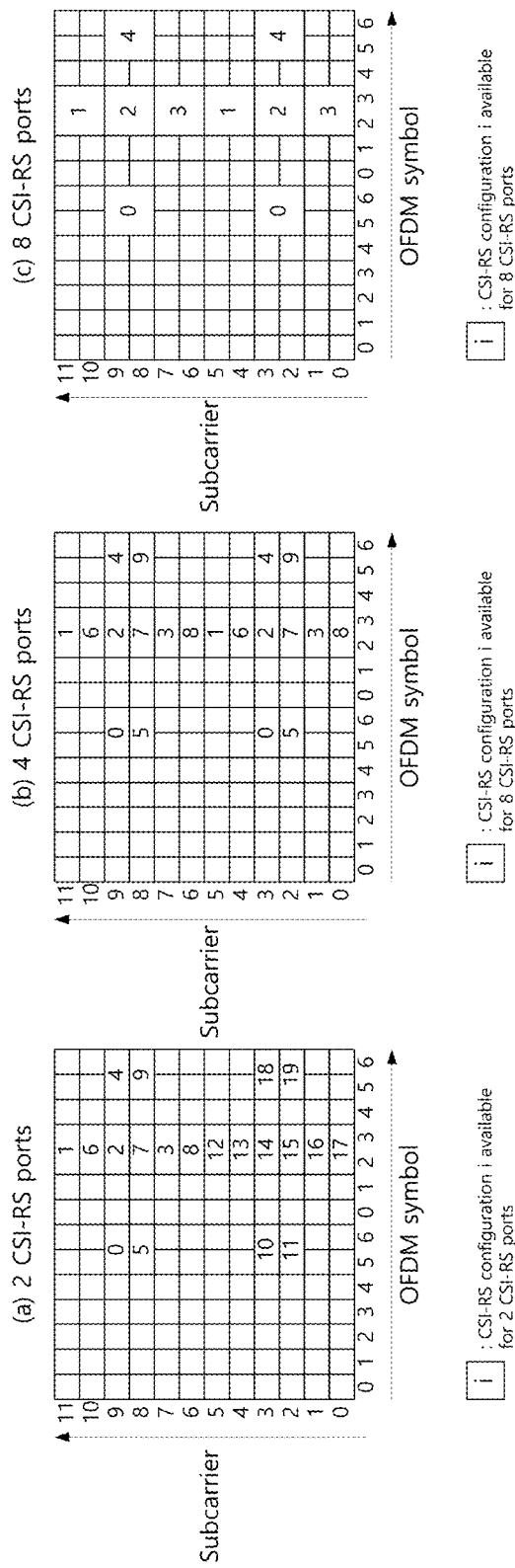

Hereinafter, DRS transmission in a licensed band will be described with reference to FIGS. 8 to 11. FIG. 8 illustrates DRS transmission, and FIGS. 9 to 11 illustrate a structure of a reference signal used in DRS. For convenience, DRS in the licensed band is referred to as Rel-12 DRS. DRS supports small cell on/off, and a SCell that is not active for any user equipment may be turned off except for DRS periodic transmission. Also, based on the DRS, a user equipment may obtain cell identification information, measure Radio Resource Management (RRM), and obtain downlink synchronization.

Referring to FIG. 8, a Discovery Measurement Timing Configuration (DMTC) indicates a time window in which a user equipment expects to receive DRS. The DMTC is fixed at 6 ms. The DMTC period is the transmission period of the DMTC, and may be 40 ms, 80 ms, or 160 ms. The position of the DMTC is specified by the DMTC transmission period and the DMTC offset (in units of subframes), and these information are transmitted to the user equipment through higher layer signaling (e.g., RRC signaling). DRS transmissions occur at the DRS occasion within the DMTC. The DRS occasion has a transmission period of 40 ms, 80 ms or 160 ms, and the user equipment may assume that there is one DRS occasion per DMTC period. The DRS occasion includes 1 to 5 consecutive subframes in the FDD radio frame and 2 to 5 consecutive subframes in the TDD radio frame. The length of the DRS occasion is delivered to the user equipment via higher layer signaling (e.g., RRC signaling). The user equipment may assume DRS in the DL subframe in the DRS occasion. DRS occasion may exist anywhere in the DMTC, but the user equipment expects the transmission interval of DRSs transmitted from the cell to be fixed (i.e., 40 ms, 80 ms, or 160 ms). That is, the position of the DRS occasion in the DMTC is fixed per cell. The DRS is configured as follows.

- Cell-specific Reference Signal (CRS) at antenna port 0 (see FIG. 9): It exists in all downlink subframes within the DRS occasion, and in the DwPTS of all the special subframes. The CRS is transmitted in the entire band of the subframe.
- Primary Synchronization Signal (PSS) (see FIG. 10): In the case of FDD radio frame, it exists in the first subframe in DRS occasion, or in the second subframe in DRS occasion in the case of TDD radio frame. The PSS is transmitted in the seventh (or sixth) OFMDA symbol of the subframe and mapped to six RBs (=72 subcarriers) close to the center frequency.
- Secondary Synchronization Signal (SSS) (see FIG. 10): It exists in the first subframe in the DRS occasion. The SSS is transmitted in the sixth (or fifth) OFMDA symbol of the subframe and mapped to six RBs (=72 subcarriers) close to the center frequency.
- non-zero-power Channel State Information (CSI)-RS (see FIG. 11): It exists in zero or more subframes in the DRS occasion. The position of the non-zero-power CSI-RS is variously configured according to the number of CSI-RS ports and the higher layer configuration information.

FIG. 8 illustrates a case where the DRS reception time is set to a separate DMTC for each frequency in a user equipment's situation. Referring to FIG. 8, in the case of frequency F1, a DRS occasion with a length of 2 ms is transmitted every 40 ms, in the case of frequency F2, a DRS occasion with a length of 3 ms is transmitted every 80 ms, and in the case of frequency F3, a DRS occasion with a length of 4 ms is transmitted every 80 ms. The user equipment may know the starting position of the DRS occasion in the DMTC from the subframe including the SSS. Here, the frequencies F1 to F3 may be replaced with corresponding cells, respectively.

Embodiment: DRS Transmission Scheme in Unlicensed Band

Figure 12:
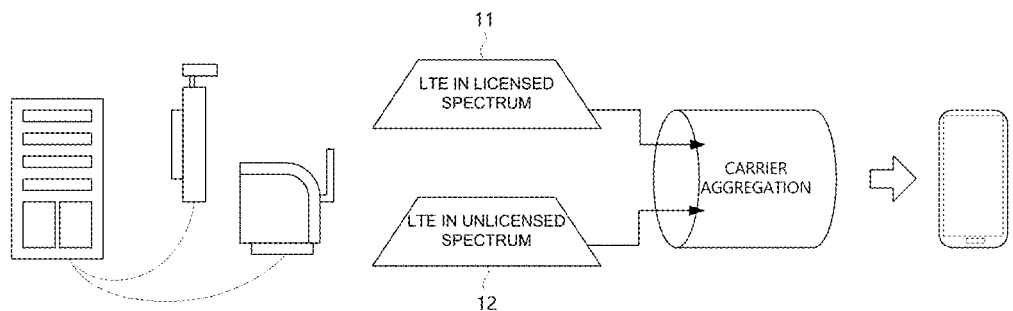
FIG. 12 illustrates a Licensed Assisted Access (LAA) service environment.

FIG. 12 illustrates a Licensed Assisted Access (LAA) service environment. Referring to FIG. 12, a service environment in which LTE technology 11 in the existing licensed band and LTE-Unlicensed (LTE-U), i.e., LTE technology 12 in the unlicensed band currently being actively discussed, or LAA are incorporated may be provided to a user.

Figure 13:
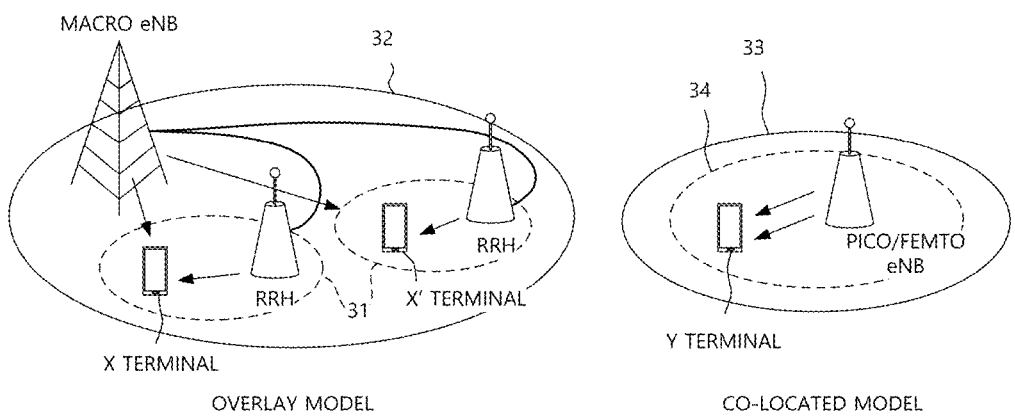
FIG. 13 illustrates a deployment scenario of a user equipment and a base station in an LAA service environment.

FIG. 13 illustrates a deployment scenario of a user equipment and a base station in an LAA service environment.

A frequency band targeted by the LAA service environment has short radio communication range due to the high frequency characteristics. Considering this, the deployment scenario of the user equipment and the base station may be an overlay model or a co-located model in an environment in which coexist the existing LTE-L service and LAA service.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LAA message or data. Therefore, conventional equipments determine the LAA message or data as a kind of energy to perform an interference avoidance operation by an energy detection technique. That is, when energy corresponding to the LAA message or data is lower than −62 dBm or certain energy detection (ED) threshold value, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LAA technology/service. However, since peripheral equipments which perform communication through the unlicensed band attempt access based on the energy detection technique, there is a problem in that an efficient LAA service is difficult. Therefore, a research into a coexistence scheme with the conventional unlicensed band device and a scheme for efficiently sharing a radio channel needs to be preferentially made in order to settle the LAA technology. That is, a robust coexistence mechanism in which the LAA device does not influence the conventional unlicensed band device needs to be developed.

Figure 14:
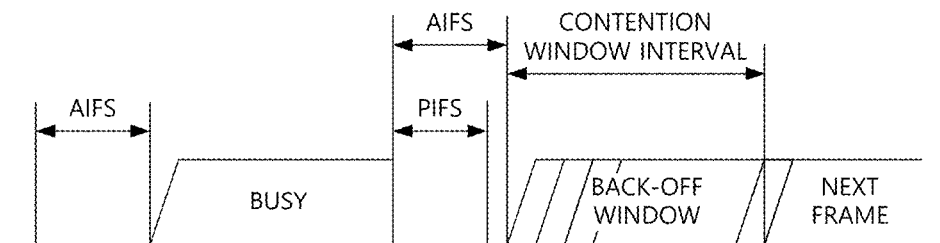
FIG. 14 illustrates a conventional communication scheme operating in an unlicensed band.

FIG. 14 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 14, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer duration (e.g., arbitration interframe space (AIFS), PCF IFS (PIFS), or the like). The defer duration means a minimum time when the terminal needs to wait after the channel is idle. The backoff procedure allows the terminal to further wait for a predetermined time after the defer duration. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Category 1: No LBT
An LBT procedure by a Tx entity is not performed.
Category 2: LBT without random backoff
A time interval in which the channel needs to be sensed in an idle state before the Tx entity performs a transmission on the channel is decided. The random backoff is not performed.
Category 3: LBT with random backoff with a CW of fixed size
LBT method that performs random backoff by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.
Category 4: LBT with random backoff with a CW of variable size
LBT method that performs the random backoff by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel.

Figure 15:
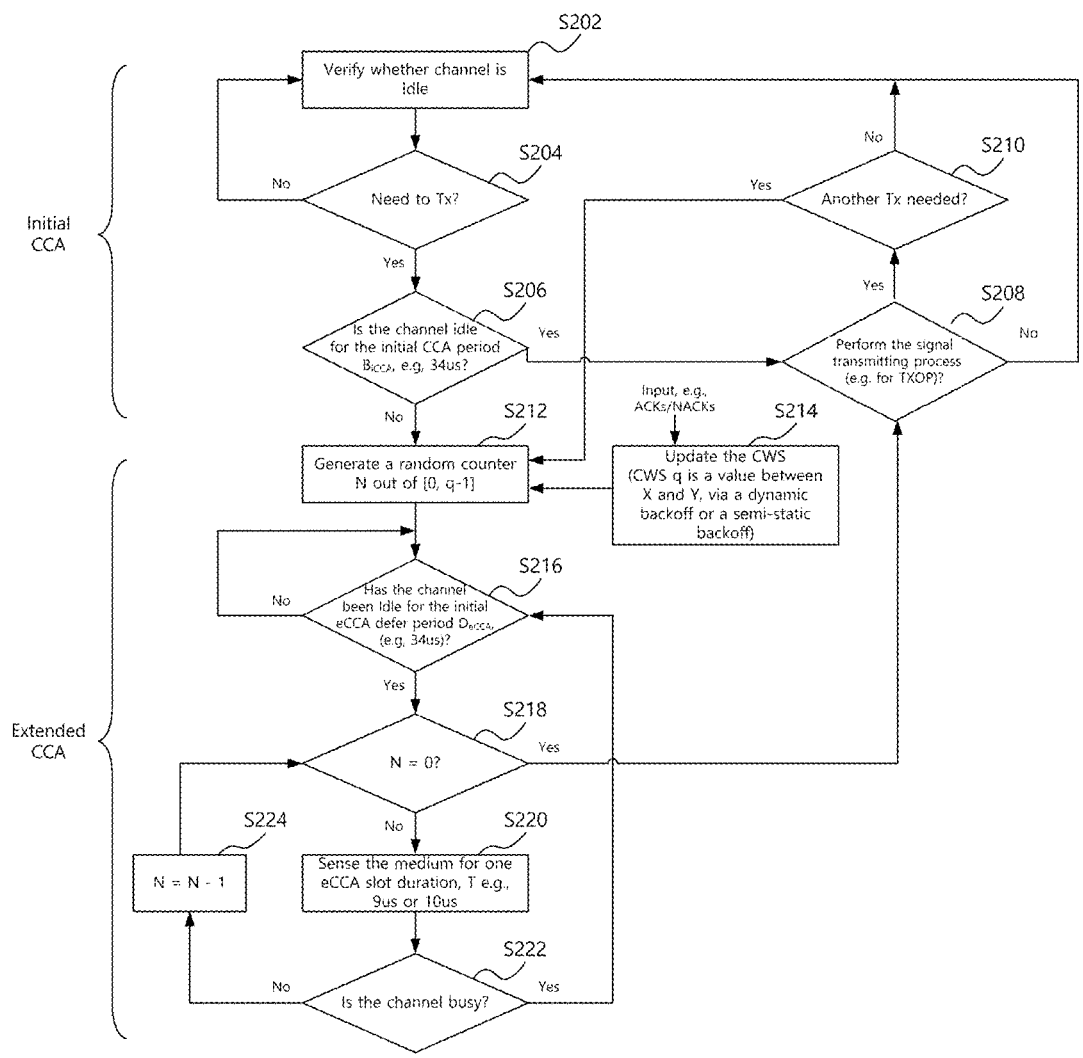
FIGS. 15 and 16 illustrate a Listen-Before-Talk (LBT) procedure for DL transmission.
Figure 16:
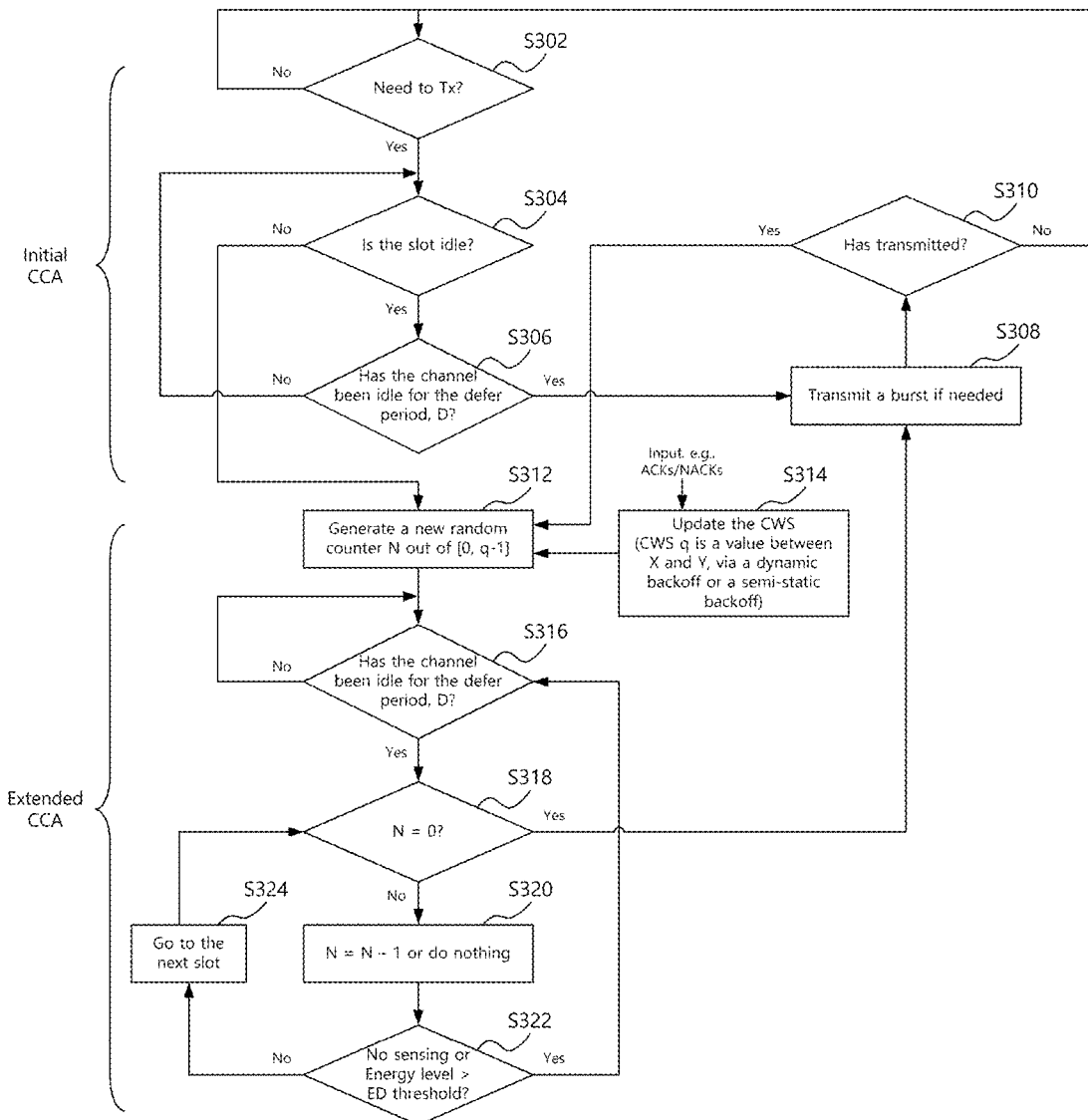

FIGS. 15 and 16 illustrate a DL transmission process based on a category 4 LBT. The category 4 LBT may be used to ensure fair channel access with Wi-Fi. Referring to FIGS. 15 and 16, the LBT process includes Initial CCA (ICCA) and Extended CCA (ECCA). That is, it is determined whether the channel is idle through the ICCA, and data transmission is performed after the ICCA period. If the interference signal is detected and data transmission fails, a data transmission time point may be obtained through a defer duration+backoff counter after setting a random backoff counter.

Referring to FIG. 15, the signal transmission process may be performed as follows.

Initial CCA

S202: The base station verifies that the channel is idle.
S204: The base station verifies whether the signal transmission is required. When the signal transmission is not required, the process returns to S202 and when the signal transmission is required, the process proceeds to S206.
S206: The base station verifies whether the channel is idle for an ICCA defer duration ($B_{CCA}$). The ICCA defer duration is configurable. As an implementation example, the ICCA defer duration may be constituted by an interval of 16 µs and n consecutive CCA slots. Herein, n may be a positive integer and one CCA slot duration may be 9 µs. The number of CCA slots may be configured differently according to a QoS class. The ICCA defer duration may be set to an appropriate value by considering a defer duration (e.g., DIFS or AIFS) of Wi-Fi. For example, the ICCA defer duration may be 34 us. When the channel is idle for the ICCA defer duration, the base station may perform the signal transmitting process (S208). When it is determined that the channel is busy during the ICCA defer duration, the process proceeds to S212 (ECCA).
S208: The base station may perform the signal transmitting process. When the signal transmission is not performed, the process proceeds to S202 (ICCA) and when the signal transmission is performed, the process proceeds to S210. Even in the case where a backoff counter N reaches 0 in S218 and S208 is performed, when the signal transmission is not performed, the process proceeds to S202 (ICCA) and when the signal transmission is performed, the process proceeds to S210.

S210: When additional signal transmission is not required, the process proceeds to S202 (ICCA) and when the additional signal transmission is required, the process proceeds to S212 (ECCA).

Extended CCA

S212: The base station generates the random number N in the CW. N is used as a counter during the backoff process and generated from [0, q−1]. The CW may be constituted by q ECCA slots and an ECCA slot size may be 9 μs or 10 μs. The CW size (CWS) may be defined as q and be variable in S214. Thereafter, the base station proceeds to S216.

S214: The base station may update CWS. CWS q may be updated to a value between X and Y. The X and Y values are configurable parameters. The CWS update/adjustment may be performed each time N is generated (dynamic back-off) or semi-static (semi-static back-off) at certain time intervals. The CWS may be updated/adjusted based on exponential back-off or binary back-off. That is, the CWS may be updated/adjusted to a power of 2 or a multiple of 2. With respect to the PDSCH transmission, the CWS may be updated/adjusted based on the terminal's feedback/report (e.g., HARQ ACK/NACK) or updated/adjusted based on the base station sensing.

S216: The base station determines that the channel is idle during the ECCA defer duration (DeCCA). The ECCA defer duration is configurable. As an embodiment, the ECCA defer duration may be composed of a 16 μs section and n consecutive CCA slots. Herein, n is a positive integer and one CCA slot duration may be 9 μs. The number of CCA slots may be set differently according to the QoS class. The ECCA defer duration may be set to an appropriate value by considering the defer duration of Wi-Fi (e.g., DIFS and AIFS). For example, the ECCA defer duration may be 34 us. If the channel is idle during the ECCA defer duration, the base station proceeds to S218. If the channel is determined to be busy during the ECCA defer duration, the base station repeats S216.

S218: The base station checks if N is 0. If N is 0, the base station may perform a signal transmission process (S208). In this case (i.e., N=0), the base station may continue the ECCA procedure by performing CCA checking during at least one slot without performing the transmission immediately. If N is not 0 (i.e., N>0), the process proceeds to S220.

S220: The base station senses the channel for one ECCA slot duration T. The ECCA slot size may be 9 μs or 10 μs, and the actual sensing time may be at least 4 μs.

S222: If it is determined that the channel is idle, the process proceeds to S224. If it is determined that the channel is busy, the process returns to S216. That is, one ECCA defer duration is reapplied after the channel is idle, and N does not count down during the ECCA defer duration.

S224: Decrement N by 1 (ECCA countdown).

FIG. 16 is substantially the same as/similar to the transmission process of FIG. 15 and differs according to the implementation method. Therefore, the details may refer to the contents of FIG. 15.

Initial CCA

S302: The base station checks whether signal transmission is needed. If no signal transmission is required, S302 is repeated, and if signal transmission is required, the process proceeds to S304.

S304: The base station checks if the slot is idle. If the slot is idle, the process proceeds to S306. If the slot is busy, the process proceeds to S312 (ECCA). The slot may correspond to the CCA slot in FIG. 15.

S306: The base station checks that the channel is idle during the defer duration D. D may correspond to the ICCA defer duration in FIG. 15. If the channel is idle during the defer duration, the base station may perform the signal transmission process (S308). If it is determined that the channel is busy during the defer duration, the process proceeds to S304.

S308: The base station may perform the signal transmission process if necessary.

S310: If there is no signal transmission, the process proceeds to S302 (ICCA), and if there is a signal transmission, the process proceeds to S312 (ECCA). Even through the back-off counter N reaches 0 in S318 and S308 is performed, if there is no signal transmission, the process proceeds to S302 (ICCA) and if there is signal transmission, the process proceeds to S312 (ECCA).

Extended CCA

S312: The base station generates a random number N in the CW. N is used as a counter in the back-off process and is generated from [0, q−1]. The CW size CWS is defined by q and may be varied in S314. Thereafter, the base station proceeds to S316.

S314: The base station may update the CWS. CWS q may be updated to a value between X and Y. The X and Y values are configurable parameters. The CWS update/adjustment may be performed each time N is generated (dynamic back-off) or semi-static (semi-static back-off) at certain time intervals. The CWS may be updated/adjusted based on exponential back-off or binary back-off. That is, the CWS may be updated/adjusted to a power of 2 or a multiple of 2. With respect to the PDSCH transmission, the CWS may be updated/adjusted based on the user equipment's feedback/report (e.g., HARQ ACK/NACK) or updated/adjusted based on the base station sensing.

S316: The base station checks that the channel is idle during the defer duration D. D may correspond to the ECCA defer duration in FIG. 15. D in S306 and S316 may be the same. If the channel is idle during the defer duration, the base station proceeds to S318. If the channel is determined to be busy during the defer duration, the base station repeats S316.

S318: The base station checks if N is 0. If N is 0, the base station may perform a signal transmission process (S308). In this case (N=0), the base station may continue the ECCA procedure by performing CCA checking during at least one slot without performing the transmission immediately. If N is not 0 (i.e., N>0), the process proceeds to S320.

S320: The base station selects one of an operation of decrementing N by 1 (ECCA countdown) and an operation of not decrementing N (self-deferral). The self-deferral operation may be performed according to the implementation/selection of the base station. At the self-deferral time, the base station does not perform sensing for energy detection and does not perform ECCA countdown.

S322: The base station may select one of an operation not to perform sensing for energy detection and an energy detection operation. If sensing for energy detection is not performed, the process proceeds to S324. When the energy detection operation is performed, if the energy level is lower than the energy detection threshold value (i.e., idle), the process proceeds to S324. If the energy level exceeds the energy detection threshold value (i.e., busy), the process returns to S316. That is, one defer duration is reapplied after the channel is idle, and N does not count down during the defer duration.

S324: The process proceeds to S318.

Figure 17:
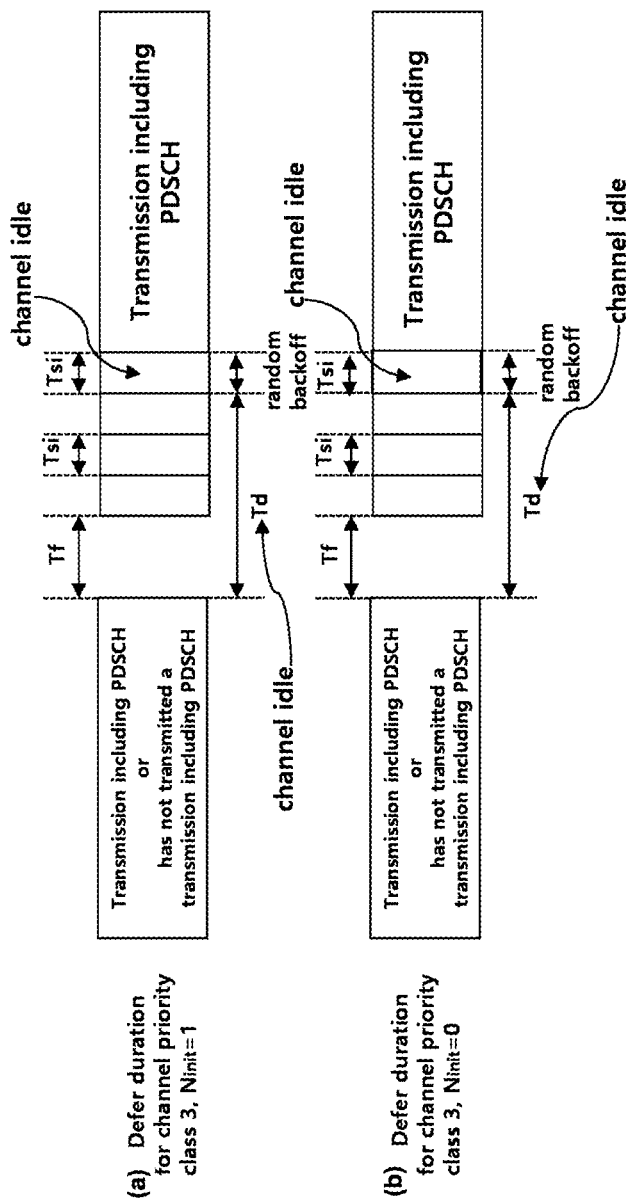
FIG. 17 shows an operation of a base station to transmit a data channel after a defer duration according to an embodiment of the present invention.

The channel access procedure described with reference to FIGS. 15 and 16 may be used not only for DL transmission but also for UL transmission. Therefore, the base station as well as the user equipment may access the channel according to the channel access procedure described with reference to FIG. 15 and FIG. 16. In the channel access procedure described with reference to FIG. 15 and FIG. 16, the wireless communication device waits for a slot duration by a random number in order to disperse access time points of various wireless communication devices that perform channel access. Therefore, the probability of selecting one of the values in the above-described CWS is uniform. In addition, for the purpose of access distribution, the wireless communication device should wait for another time according to the obtained random number. Referring to FIGS. 17 to 21, a specific operation of the wireless communication device that waits for a slot duration of a random number will be described. For convenience of explanation, FIG. 17 shows an operation in which a base station according to an embodiment of the present invention transmits a data channel after a defer duration Td. As described above, the wireless communication device determines whether the channel is idle during the defer duration. After the defer duration, the wireless communication device waits based on the counter value N determined based on the random number and the slot duration. At this time, the base station may start transmission including data when the counter value N is 0. In a specific embodiment, the data may be a data channel. Specifically, the data channel may be either a PDSCH or a PUSCH. In yet another specific embodiment, the data may be a control channel. At this time, the control channel may be a PDCCH or an EPDCCH. The wireless communication device sets the counter value N to be randomly selected for access distribution and determines whether the channel to be accessed during a slot duration is idle according to the corresponding counter value. For convenience of explanation, this counter value setting procedure is referred to as a random counter value setting procedure.

Specifically, the wireless communication device detects whether the channel is idle during the defer duration. When the channel is idle during the defer duration, the wireless communication device may set the counter value according to the following procedure.

1) The wireless communication device sets counter (N)=Ninit. Ninit is a random number uniformly distributed within 0 and $CW_p$.

2) When N>0 and the wireless communication device determines to decrease N, set N=N−1.

3) Senses the channel during one additional slot duration, and when the channel is idle during that one slot duration, the wireless communication device goes to step 4), otherwise goes to step 5).

4) When N=0, the wireless communication device stops the counter value setting procedure. When not N=0, the wireless communication device goes to step 2).

5) The wireless communication device senses the channel during one additional defer duration.

6) When the channel is idle during a plurality of slot durations that include one additional defer duration, the wireless communication device goes to step 2), and when the channel is not idle during that one additional defer duration, the wireless communication device goes to step 5).

When the wireless communication terminal fails to transmit data on the channel to be accessed in step 4) in the above-described procedure, the wireless communication terminal may transmit data when the channel is idle during one additional defer duration. In addition, when the wireless communication device stops the counter value setting procedure, the wireless communication device starts the transmission including the data channel.

When the data includes a data channel, the defer duration may be set according to the channel access priority class of the traffic that the data channel includes. At this time, the channel access priority class may be a channel access priority class. Also, the defer duration may be composed of 16 us (Tf) and m_p number of slot durations. At this time, each slot duration Ts1 may be 9 us. Tf includes one idle slot duration Ts1. Also, the m_p value may be set according to the channel access priority class as shown in Table 2 below.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In addition, the wireless communication device may also set a range of CW values according to the channel access priority class. Specifically, the wireless communication device may set the range of the CW values to satisfy $CW_{min,p} \leq CW_p \leq CW_{max,p}$. At this time, the value of $CW_{min,p}$ and the value of $CW_{max,p}$ may be determined according to the channel access priority class as shown in Table 2 described above. Also, the wireless communication device may set the value of $CW_{min,p}$ and the value of $CW_{max,p}$ in step 1) of the counter value setting procedure. During channel access, the base station may adjust the CW value as described above.

Also, the maximum transmission duration $T_{mcot,p}$ (maximum channel occupancy time (MCOT)) that may be used in one transmission through a channel included in the unlicensed band may be determined according to the channel access priority of the transmitted data. Specifically, it may be determined as shown in Table 2 above. Accordingly, the wireless communication device should not maintain a transmission continuously more than a time T_mcot,p. In the unlicensed band, since it is a frequency band accessed by several wireless communication devices through contention procedures, it is not preferable that any one of the wireless communication devices continuously use the frequency band for a predetermined time or more. In Table 2, when the value of the channel access priority class is p=3 or p=4, in a long term, the unlicensed band is used according to the rule, and there is no wireless communication device using other technology, the wireless communication device may set to T_mcot,p=10 ms. Otherwise, the wireless communication device may set to T_mcot,p=8 ms.

Also, the wireless communication device determines whether the channel is idle based on an energy detection (ED) threshold value. Specifically, the wireless communication device may determine that the channel is idle when the energy detected by the channel is smaller than the threshold value. At this time, the ED threshold value may vary depending on whether or not a wireless communication device using other technology coexists. In addition, the ED threshold may vary depending on the country and region. Specifically, the ED threshold value may be determined as shown in Table 3 below.

TABLE 3

| Case | ED adaptation rule | Note |
|---|---|---|
| Case 1: Coexistance with other technologies | $X_{Thresh\_max} = \max\left\{\begin{array}{l}-72 \text{ dBm (20 MHz)}, \\ \min\left\{\begin{array}{l}T_{max}, \\ T_{max} - T_A + (P_H - P_{TX})\end{array}\right\}\end{array}\right\}$ $P_H = 23$ dB $P_{TX}$ is the set Max eNB output power in the dBm for the carrier | $T_A = 10$ dB for fx(s) including PDSCH; $T_A = 5$ dB for fx(s) including DRS transmission(s) and not including PDSCH |
| Case 2: Absence of Wi-Fi(e.g: by level of regulation) | $X_{Thresh\_max} = \min\left\{\begin{array}{l}T_{max} + 10 \text{ dB}, \\ X_r\end{array}\right\}$ Xr[dBm] is MAX ED threshold defined by regulation Otherwise | |

In this case, the value of $T_{max}$ in Table 3 may be determined as shown in the following equation.

$$T_{max}(\text{dBm}) = 10 \cdot \log 10(3.16228 \cdot 10^{-8}(\text{mW/MHz}) \cdot \text{BWMHz(MHz)})$$

FIGS. 17(a) and 17(b) are diagrams for the case where the base station follows the random counter value setting procedure in the channel access procedure described above.

In the above-described random counter value setting procedure, when the wireless communication device obtains the random number 1 as the initial value of the counter and when the random number 0 is obtained, the length of the waiting interval according to the counter value may be the same. Specifically, in the case where the base station obtains the random number 1 as the initial value of the counter as shown in FIG. 17(a), when following the counter value setting procedure described above, the channel is idle for the defer duration and during one slot duration, the base station starts the transmission including data. In addition, in the case where the base station obtains the random number 0 as the initial value of the counter as shown in FIG. 17(b), when following the counter value setting procedure described above, the corresponding channel is idle for the defer duration, and when there is idle during one slot duration, the base station starts the transmission including data. Specifically, the base station determines whether the corresponding channel is idle during one slot duration by proceeding from step 1) to step 3) without determining whether the counter value is 0 (N=0) in the above-described counter value setting procedure. Therefore, when the base station follows the random counter value setting procedure in the channel access procedure described above, the base station may start transmission including the data channel at the same time point when the base station obtains the random number 0 and when the base station obtains the random number 1. As a result, even when the wireless communication device obtains a different random number, the wireless communication device determines whether the channel is idle during the same number of slot durations. In this case, the wireless communication device may not prevent that colliding with a channel access of another wireless communication device occurs by using the random number.

Figure 18:
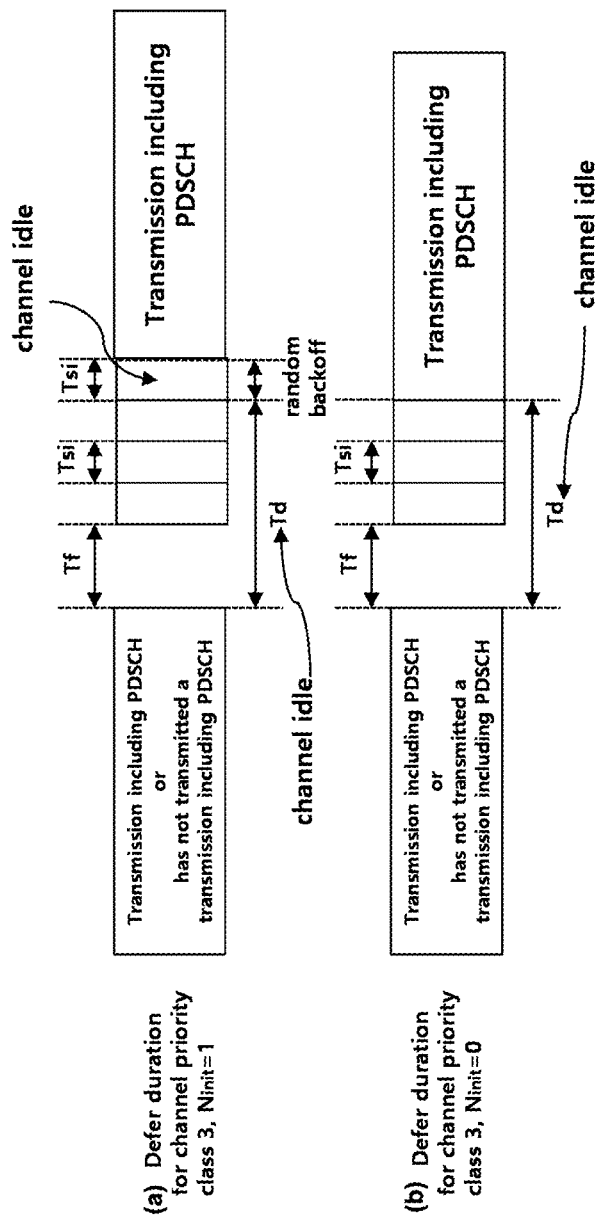
FIG. 18 shows an operation of a base station to transmit a data channel after a defer duration according to an embodiment of the present invention.

FIG. 18 shows an operation of a base station to transmit a data channel after a defer duration according to an embodiment of the present invention.

At the start of the counter value setting procedure, when the initial value of the counter is 0, the wireless communication device may directly access the corresponding channel. Specifically, at the start of the counter value setting procedure, when the initial value of the counter is 0, the wireless communication device may immediately start transmission including data over the channel. At this time, the data may be a data channel as described above. Specifically, the data channel may be either a PDSCH or a PUSCH. Further, the data may be a control channel. Specifically, the control channel may be a PDCCH or an EPDCCH. Specifically, after the defer duration when it is determined that the channel is idle, when the initial value of the counter is 0, the wireless communication device may access the corresponding channel without sensing that the corresponding channel is idle during one slot time. In a specific embodiment, at the start of the counter value setting procedure, when the initial value of the counter is 0, the wireless communication device may access the channel at the end of the defer duration when it is determined that the corresponding channel is idle. In a specific embodiment, the wireless communication device may determine whether the value of the counter is 0 after setting the initial value of the counter at the start of the counter value setting procedure. For example, in the above-described counter setting procedure, the wireless communication device may determine whether the initial value of the counter is 0 after step 1). At this time, when the value of the counter is 0, the wireless communication device may access the corresponding channel. Through this, when the initial value of the counter is Y and the initial value of the counter is (Y+1), the wireless communication device may change the number of the slot durations necessary to determine whether the corresponding channel is idle. At this time, when the obtained random number is Y, the wireless communication device determines whether the corresponding channel is idle during the defer duration and Y slot durations. In addition, when the obtained random number is (Y+1), the wireless communication device determines whether the corresponding channel is idle during the defer duration and (Y+1) slot durations. In this case, Y may be 0. Also, Y may be a natural number of 0 or more.

Specifically, the wireless communication device senses whether the channel is idle during the defer duration, and sets the counter value according to the following procedure when the channel is idle during the defer duration.

1) The wireless communication device sets counter N=$N_{init}$. $N_{init}$ is a random number uniformly distributed within 0 and $CW_p$. At this time, when N=0, the counter value setting procedure is stopped. When not N=0, go to step 2).

2) When N>0 and the base station determines to decrease N, then the wireless communication device sets N=N−1.

3) When the channel is idle during one additional slot duration, the wireless communication device goes to step 4), otherwise goes to step 5).

4) When N=0, the wireless communication device stops the counter value setting procedure. When not N=0, the wireless communication device goes to step 2).

5) The wireless communication device senses the channel during one additional defer duration.

6) When the channel is idle during a plurality of slot durations included in one additional defer duration, the wireless communication device goes to step 2). When the channel is not idle during one additional defer duration, the wireless communication device goes to step 5).

At this time, the other operation of the wireless communication device may be the same as the counter value setting procedure described above.

In addition, the wireless communication device may operate as shown in FIG. 18. The channel access priority class corresponding to the data channel PDSCH in FIG. 18(a) and FIG. 18(b) is 3. Therefore, the defer duration Td is set to a defer duration corresponding to a channel access priority class of 3. In the embodiment of FIG. 18(a), the base station determines whether a channel for transmitting data PDSCH/PDCCH/EPDCCH during a defer duration Td is idle. At this time, when the corresponding channel is idle during the defer duration (Td), the base station obtains the random number according to step 1), and sets the obtained random number as the counter value N. In the embodiment of FIG. 18(a), the base station obtains a random number of 1 and sets N=1. Next, the base station determines whether the value N of the counter is 0 or not. The initial value $N_{init}$ of the counter is selected as 1 and the counter value N is 1, so that step 2) is performed. In step 2), when N is greater than 0 and the base station determines to decrease the counter, the base station subtracts 1 from the counter value and sets the counter value to 0. Next, in step 3), the base station determines whether the corresponding channel is idle during one slot duration $T_{s1}$. When the corresponding channel is idle during one slot duration $T_{s1}$, the base station determines whether the counter value is 0 in step 4). When the counter value is 0 in step 4), the counter value setting procedure is stopped, and the base station starts transmission including data PDSCH/PDCCH/EPDCCH. Specifically, the base station may start transmission including data PDSCH/PDCCH/EPDCCH at the end of one slot duration $T_{s1}$ after the defer duration $T_d$.

In the embodiment of FIG. 18(b), the base station determines whether a channel for transmitting data PDSCH/PDCCH/EPDCCH during a defer duration $T_d$ is idle. When the corresponding channel is idle during the defer duration $T_d$, the base station obtains the random number according to step 1), and sets the obtained random number as the counter value N. In the embodiment of FIG. 18(b), the base station obtains a random number 0 and sets N=0. Next, the base station determines whether the value N of the counter is 0 or not. Since the initial value $N_{init}$ of the counter is 0 and thus the counter value N is 0, the base station stops the counter value setting procedure and starts transmission including the data channel PDSCH/PDCCH/EPDCCH. Specifically, the base station may start the transmission including the data channel PDSCH/PDCCH/EPDCCH without sensing whether the corresponding channel is idle for one slot duration $T_{s1}$ after the defer duration $T_d$. The base station may start transmission including data PDSCH/PDCCH/EPDCCH at the end of the corresponding defer duration $T_d$. As shown in FIG. 18, the base station according to the above-described embodiment may access the channel at different time points when the obtained random numbers are different from each other. The wireless communication device described with reference to FIGS. 17 and 18 may be a base station or a user equipment. Therefore, the embodiment of the present invention described with reference to FIGS. 17 and 18 may be equally applied to a channel access operation of a user equipment.

In the case of the embodiment described with reference to FIG. 18, it is described that when the wireless communication device determines that the channel is idle by a interval according to the counter value after the defer duration Td, the channel is idle continuously. However, when the wireless communication device determines that the channel is idle by the interval corresponding to the counter value after the defer duration, when the corresponding channel is busy, the wireless communication device again determines whether the corresponding channel is idle by the defer duration. In this case, the counter value setting procedure will be described with reference to FIG. 19 and FIG. 20.

Figure 19:
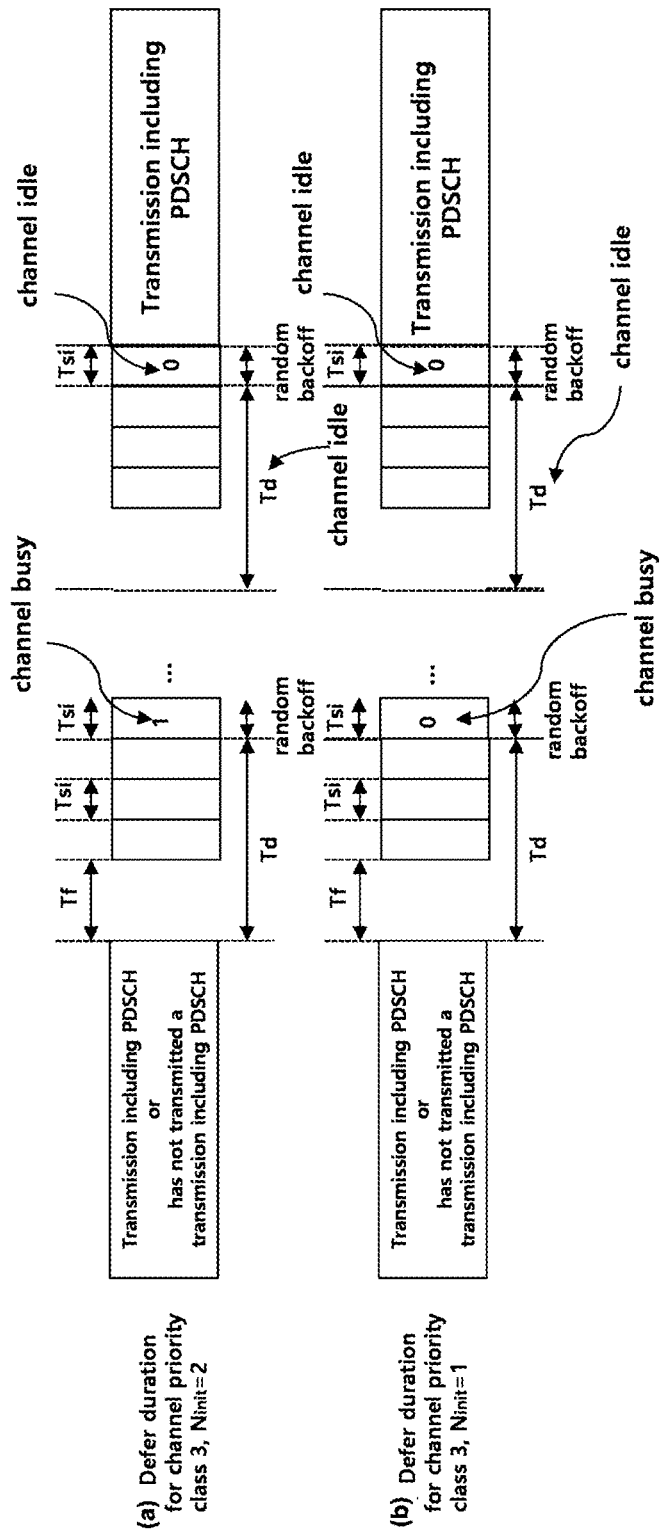
FIG. 19 shows an operation in which a base station transmits a data channel after an additional defer duration, when a base station determines that a channel for transmitting a data channel is busy in a time interval determined based on a random number, according to an embodiment of the present invention.

FIG. 19 shows an operation in which a base station transmits a data channel after an additional defer duration, when a base station determines that a channel for transmitting a data channel is busy in a time interval determined based on a random number, according to an embodiment of the present invention.

In the above-described counter value setting procedure, when the wireless communication device determines that the corresponding channel is idle by the number of the slot durations according to the random number value after the defer duration, the corresponding channel may be busy. At this time, the wireless communication device determines whether the channel is idle during the defer duration according to step 5) of the counter value setting procedure. When the channel is idle during the defer duration, the wireless communication device proceeds from step 2) of the counter value setting procedure again. Therefore, the wireless communication device does not determine whether the counter value is 0, and determines whether the channel is idle during one slot duration according to step 3). Therefore, in both the case of FIG. 19(a) where the wireless communication device proceeds from step 2) again when the counter value is 1 and the case of FIG. 19(b) where the wireless communication device proceeds from step 2) when the counter value is 0, the wireless communication device determines whether the channel is idle during one slot duration. As a result, even when different counter values are set, the wireless communication device determines whether the channel is idle during the same number of slot durations. Thus, when following this access procedure, the wireless communication device may not achieve the purpose of preventing channel access from overlapping with channel access of another wireless communication device by using the random number.

Figure 20:
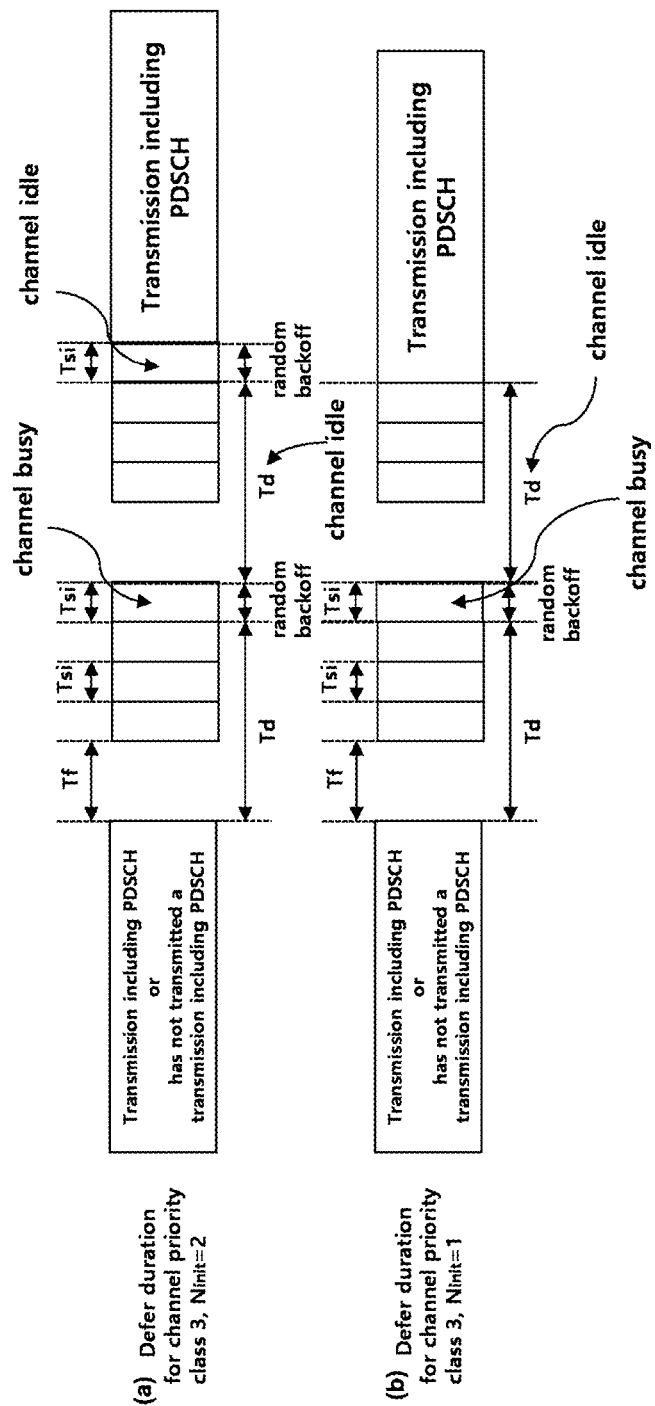
FIG. 20 shows an operation of a base station to transmit a data channel after an additional defer duration according to an embodiment of the present invention.

FIG. 20 shows an operation of a base station to transmit a data channel after an additional defer duration according to an embodiment of the present invention.

The wireless communication device may directly access the channel when the channel is idle during the additional defer duration and the counter value N is 0. Specifically, when the channel is idle during the additional defer duration and the value N of the counter is 0, the wireless communication device may immediately start transmission including data through the corresponding channel. In this case, when the wireless communication device determines that the corresponding channel is idle by the number of the slot durations according to the random number after the defer duration, an additional defer duration may represent an interval for determining again whether the corresponding channel is idle during the defer duration because the corresponding channel is busy. Specifically, the additional defer duration may represent the defer duration of step 5) in the counter setting procedure described above. In addition, when the corresponding channel is idle during the additional defer duration and the counter value is 0, the wireless communication device may access the corresponding channel without sensing that the corresponding channel is idle during one slot duration. Specifically, when the counter value N is 0 and the corresponding channel is idle during the additional defer duration, the wireless communication device may access the channel at the end of the additional defer duration. In a specific embodiment, when determining whether the channel is idle during an additional defer duration, the wireless communication device may determine whether the counter value is 0. For example, the wireless communication device may determine whether the counter value is 0 after determining that the corresponding channel is idle in step 6) of the counter setting procedure described above. At this time, when the counter value is 0, the wireless communication device directly starts transmission including the data channel through the corresponding channel. Through this, even when the value of the counter after the extra defer duration is Y and the value of the counter is (Y+1), the wireless communication device may change the number of the slot durations necessary to determine whether the corresponding channel is idle. At this time, when the random number obtained by the wireless communication device is Y, the wireless communication device determines whether the channel is idle during a defer duration, an additional defer duration, and Y slot durations. Also, when the random number obtained by the wireless communication device is (Y+1), the wireless communication device determines whether the corresponding channel is idle during a defer duration, an additional defer duration, and (Y+1) slot durations. In this case, Y may be 0. Also, Y may be a natural number of 0 or more.

Specifically, the wireless communication device may sense whether the channel is idle during the defer duration. When the channel is idle during the defer duration, the wireless communication device may set the counter value according to the following procedure.

1) The wireless communication device sets counter N=$N_{init}$. $N_{init}$ is a random number with a uniform probability between 0 and $CW_p$. Then, the wireless communication device goes to step 4).

2) When N>0 and the wireless communication device determines to decrease N, the wireless communication device sets N=N−1.

3) When the channel is idle during one additional slot duration, goes to step 4), otherwise goes to step 5).

4) When N=0, the wireless communication device stops the counter value setting procedure. When not N=0, the wireless communication device goes to step 2).

5) The wireless communication device senses the channel during one additional defer duration.

6) When the channel is idle during all the plurality of slot durations of one additional defer duration, the wireless communication device goes to step 4). Otherwise, the wireless communication device goes to step 5).

At this time, the other operation of the wireless communication device may be the same as the counter value setting procedure described above.

Figure 21:
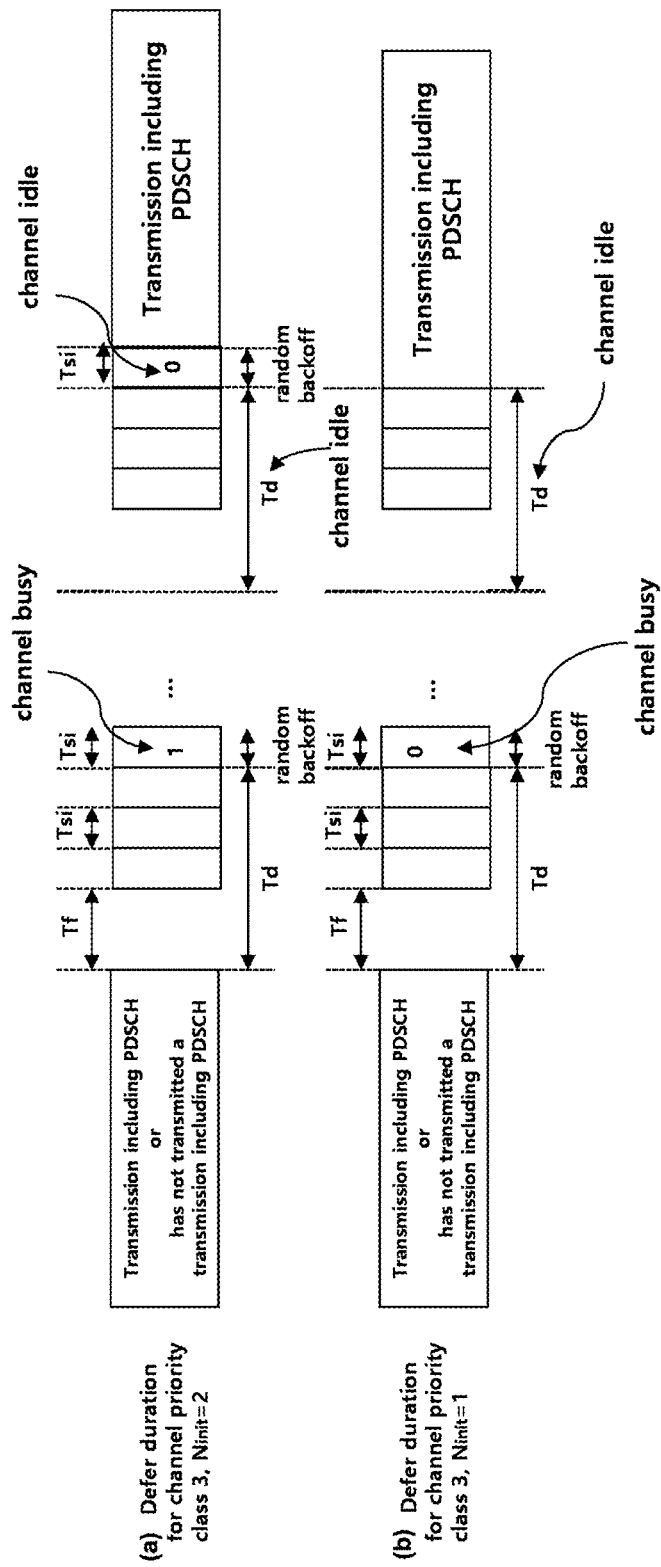
FIG. 21 shows an operation of a base station to transmit a data channel after an additional defer duration according to an embodiment of the present invention, when the additional defer duration is not continuous.

Specifically, the wireless communication device may operate as shown in FIGS. 20 and 21. First, the channel access priority class corresponding to the data channel PDSCH in FIG. 20(a) and FIG. 20(b) is 3. Therefore, the defer duration $T_d$ is set to a duration of a defer duration corresponding to a channel access priority class of 3.

In the embodiment of FIG. 20(a), the base station determines whether a channel for transmitting data PDSCH/PDCCH/EPDCCH during a first defer duration Td is idle. When the channel is idle during the first defer duration $T_d$, according to step 1), the base station obtains a random number as the initial value N_init, and sets the counter value N to the initial value $N_{init}$. In the embodiment of FIG. 20(a), the base station obtains a random number 2 as the initial value $N_{init}$, and sets N=2. Next, the base station determines whether the value N of the counter in step 4) is 0.

Since the value N of the counter is 2, the base station performs step 2). That is, in step 2), when N is greater than 0 and the base station determines to decrease the counter, the base station subtracts 1 from the counter value and sets the counter value to 1. In step 3), the base station determines whether the corresponding channel is idle during one slot duration $T_{s1}$. When the corresponding channel is not idle during one slot duration $T_{s1}$, the base station performs step 5). In step 5), the base station determines whether the corresponding channel is idle for another additional defer duration $T_d$. When the corresponding channel is idle during one defer duration $T_d$, the base station goes to step 4) and determines whether the counter value is 0. Since the counter value is 1, not 0, the base station performs step 2). That is, in step 2), when N is greater than 0 and the base station determines to decrease the counter, the base station subtracts 1 from the counter value and sets the counter value to 0. Next, in step 3), the base station determines whether the corresponding channel is idle during one slot duration $T_{s1}$. When the corresponding channel is idle during one slot duration $T_{s1}$, the base station determines whether the counter value is 0 in step 4). When the current counter value is 0 in step 4), the base station stops the counter value setting procedure and starts transmission including data PDSCH/PDCCH/EPDCCH. Specifically, the base station may start transmission including data PDSCH/PDCCH/EPDCCH at the end of one slot duration $T_{s1}$ after the additional defer duration.

In the embodiment of FIG. 20(b), the base station determines whether a channel for transmitting data PDSCH/PDCCH/EPDCCH during a defer duration Td is idle. At this time, when the corresponding channel is idle during the first defer duration $T_d$, according to step 1), the base station obtains a random number as the initial value $N_{init}$, and sets the counter value N to the initial value $N_{init}$. In the embodiment of FIG. 20(b), the base station obtains a random number of 1 as the initial value $N_{init}$ and sets N=1. The base station determines whether the value N of the counter in step 4) is 0. Since the value N of the counter is 1, the base station performs step 2). That is, in step 2), when N is greater than 0 and the base station determines to decrease the counter, the base station subtracts 1 from the counter value and sets the counter value to 0. Then, in step 3), the base station determines whether the corresponding channel is idle during one slot duration $T_{s1}$. When the corresponding channel is not idle during one slot duration $T_{s1}$, the base station performs step 5). In step 5), the base station determines whether the corresponding channel is idle for another additional defer duration $T_d$. The base station senses the channel during one additional defer duration $T_d$. When the corresponding channel is idle during one defer duration $T_d$, the base station goes to step 4) and determines whether the current counter value is 0. Since the current counter value is 0 in step 4), the base station stops the counter setting and starts transmission including data PDSCH/PDCCH/EPDCCH. Specifically, the base station may start the transmission including the data channel PDSCH at the end of the additional defer duration $T_d$. As shown in FIG. 20, even when the channel is idle during an additional defer duration while the channel is accessed, the wireless communication device according to the above-described embodiment may start transmission including data channel at different time points when the obtained random numbers are different from each other.

FIGS. 21(a) and 21(b) show an operation of a base station according to an embodiment of the present invention to transmit a data channel after an additional defer duration when the additional defer durations are not continuous. Even when the additional defer duration is not continuous, the wireless communication device may operate in the same manner as the embodiment described with reference to FIG. 20. The wireless communication device described with reference to FIGS. 19 to 21 may be a base station or a user equipment. Therefore, the embodiment of the present invention described with reference to FIGS. 19 to 21 may be equally applied to a channel access operation of a user equipment.

As described above, the base station determines whether the corresponding channel is idle during an additional defer duration when a channel is accessed. At this time, a specific channel sensing method of the base station will be described with reference to FIG. 22 to FIG. 24.

Figure 22:
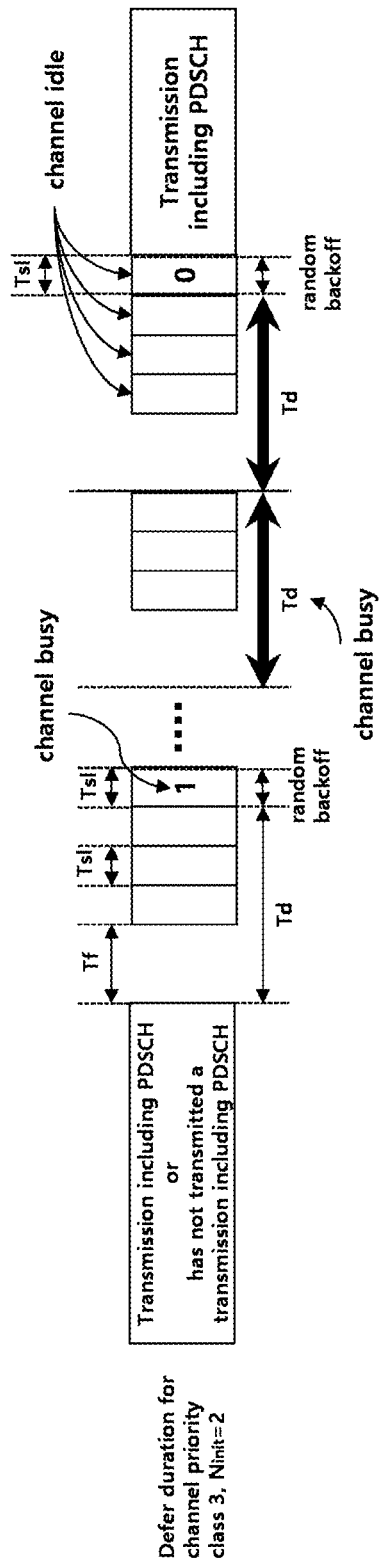
FIG. 22 shows an additional defer operation of a base station according to an embodiment of the present invention.

FIG. 22 shows an additional defer operation of a base station according to an embodiment of the present invention.

In the counter value setting procedure described above, the wireless communication device may sense the channel in defer duration units (granularity). When a wireless communication device senses a channel by a defer duration unit, the channel access operation of the wireless communication device may be inefficient. For example, in the embodiment of FIG. 22, the base station determines that a channel to be accessed during any one of the slot durations Ts1 included in the additional defer duration Td during the additional defer duration operation is busy. At this time, after the corresponding additional defer duration is terminated, the base station starts to sense the channel again. Therefore, even when the corresponding channel is busy during the first slot duration of the plurality of slot durations included in the defer duration and the corresponding channel is idle during the remaining slot duration, after the corresponding defer duration ends, the channel is accessed again. Therefore, when the wireless communication device senses a channel by a defer duration unit, the base station may waste the opportunity to access the idle channel. Therefore, the wireless communication device may determine whether the channel to be accessed during the defer duration is idle by a slot duration unit. Specifically, the wireless communication device may determine the idle channel in the additional defer duration by a slot duration unit. The specific operation of the base station will be described with reference to FIGS. 23 and 24.

Figure 23:
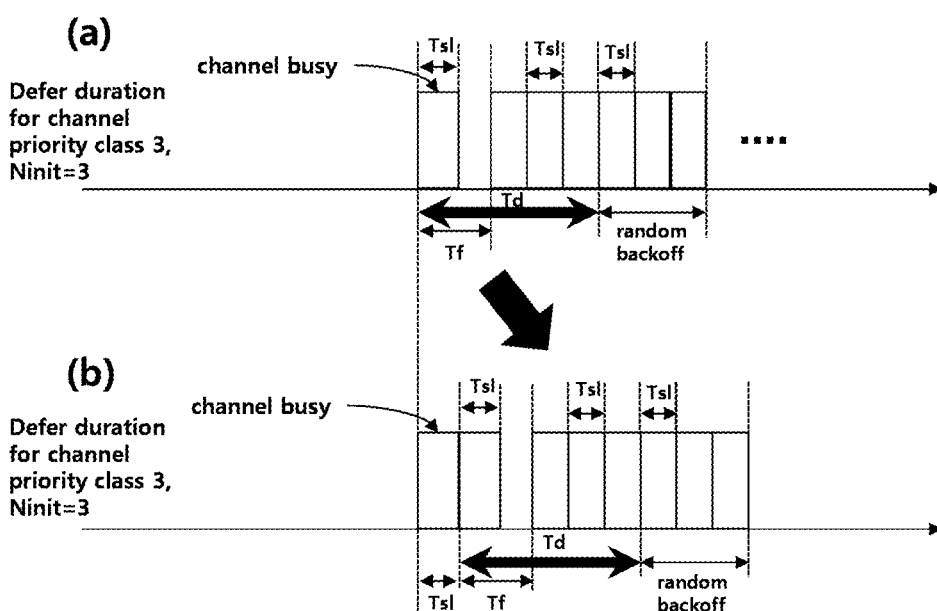
FIG. 23 shows an additional defer operation of a base station according to another embodiment of the present invention.
Figure 24:
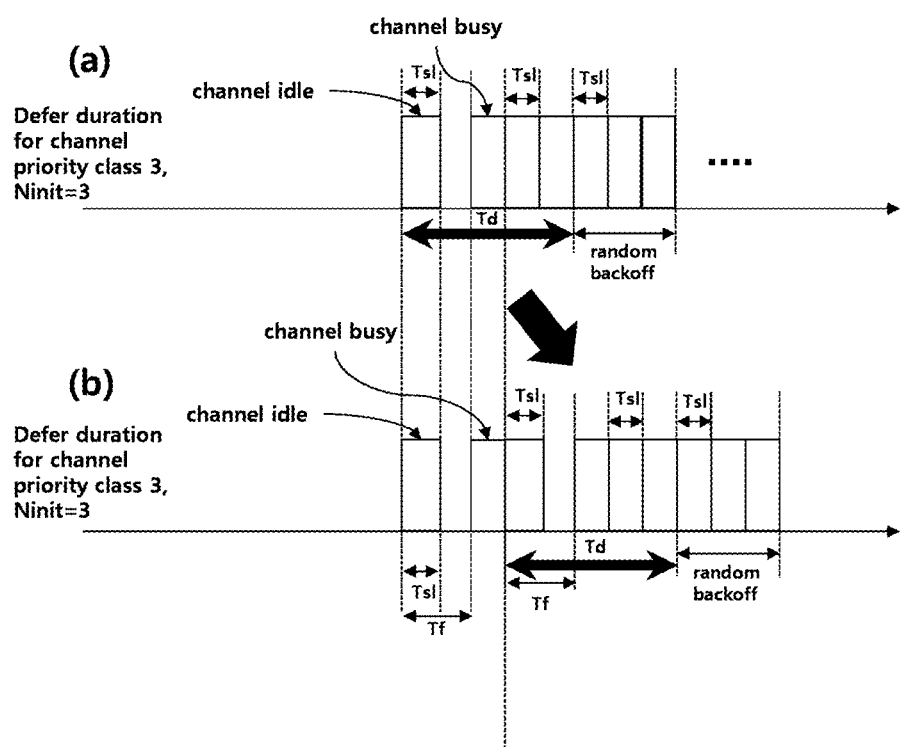
FIG. 24 shows an additional defer operation of a base station according to another embodiment of the present invention.

FIGS. 23 and 24 show an operation of an additional defer duration of a base station according to another embodiment of the present invention.

The wireless communication device may determine the idle channel in the additional defer duration by a slot duration unit. Specifically, when the wireless communication device senses that the corresponding channel is busy among the additional defer durations, the wireless communication device may determine whether the corresponding channel is idle during the additional defer duration from the end of the slot duration which is determined to be busy. In the embodiment of FIG. 23(a), the base station determines that the channel accessed during the first slot duration $T_{s1}$ included in the defer duration $T_d$ is busy. At this time, the base station determines whether the corresponding channel is idle during the new defer duration $T_d$ from the end of the first slot duration $T_{s1}$ as in the embodiment of FIG. 23(b). In the embodiment of FIG. 24(a), the base station determines that the channel accessed during the second slot duration $T_{s1}$ included in the defer duration $T_d$ is busy. At this time, as in the embodiment of FIG. 24(b), the base station determines whether the corresponding channel is idle during the new defer duration $T_d$ from the end of the second slot duration $T_{s1}$ included in the defer duration $T_d$.

In the above-described counter value setting procedure, in the additional defer duration steps 5) and 6), the wireless communication device may operate as follows. The wireless communication device may sense whether the corresponding channel is busy during any slot duration of the plurality of slot durations included in the additional defer duration and whether the corresponding channel is idle during all slot durations included in the additional defer duration. Specifically, the wireless communication device may sense the channel until a non-idle slot duration is sensed in the additional defer duration, or until all slot durations are sensed as idle during the additional defer duration. In a specific embodiment, when the corresponding channel is busy during a slot duration of the additional defer duration, the wireless communication device proceeds to step 6) when it determines that the channel is busy. At this time, the wireless communication device repeats the operation of step 5) again. Also, when the channel is idle during all slot durations included in the additional defer duration, the wireless communication device goes to step 6) at the end of the corresponding defer duration. At this time, the wireless communication device goes to step 4).

The wireless communication device described with reference to FIGS. 23 and 24 may be a base station or a user equipment. Therefore, the embodiment of the present invention described with reference to FIGS. 23 and 24 may be equally applied to a channel access operation of a user equipment.

A wireless communication device may perform transmission through a plurality of carriers or a plurality of channels. Accordingly, the embodiments described above may be equally used when a wireless communication device accesses a plurality of channels as well as when accessing any one channel. At this time, access methods for a plurality of carriers or a plurality of channels may be distinguished as follows. When a wireless communication device performs a channel access procedure independently from each of a plurality of channels or a plurality of carriers, the corresponding channel access may be classified as Type A. In this case, when the wireless communication device obtains a random number independently for each carrier or each channel, the corresponding channel access may be classified into Type A1. Also, when the wireless communication device obtains and uses one random number based on the largest CWS among the CWS corresponding to a carrier or a channel, the corresponding channel access may be classified as Type A2. In addition, when a wireless communication device accesses a channel on a plurality of channels or a plurality of carriers based on the channel access procedure for any one channel or any one carrier, the corresponding channel access may be classified as Type B.

When a wireless communication device accesses a plurality of channels or a plurality of carriers according to the classification described above, the wireless communication device may not be able to start transmissions simultaneously on a plurality of channels or a plurality of carriers. Therefore, the wireless communication device may perform an operation for starting transmission simultaneously on a plurality of channels or a plurality of carriers in the counter value setting procedure described above. Specifically, in the counter value setting procedure described above, the wireless communication device may selectively subtract 1 from the counter value. Through this, the wireless communication device may delay the start of transmission on any one channel. However, such an operation may not be applied when determining whether transmission is started depending on whether the counter initial value is 0. Specifically, in the counter value setting procedure, the random number corresponding to one channel may be 0, and the random number corresponding to the other channel may not be 0. At this time, the wireless communication device may start the transmission directly on the channel corresponding to the random number of 0 according to step 1) in the embodiment described with reference to FIG. 17.

Thus, after the wireless communication device obtains a random number, the wireless communication device may set a number greater than the random number to the initial value of the counter. Specifically, the wireless communication device may set the initial value of the counter to a value larger by 1 than the obtained random number. For example, in step 1) of the counter value setting procedure described above, the wireless communication device may set $N=N_{init}+1$ and go to step 2). Specifically, step 1) of the counter value setting procedure may be as follows.

1) The wireless communication device sets counter $N=N_{init}$. $N_{init}$ is a random number uniformly distributed within 0 and $CW_p$. At this time, when N=0, the wireless communication device may select one of the two options. In the first option, the wireless communication device sets N=1 and goes to step 2). In the second option, the wireless communication device stops the counter value setting procedure. When not N=0, the wireless communication device goes to step 2).

The wireless communication device may apply these embodiments related to the initial value setting of the counter to both channel access of Type A and channel access of Type B. In addition, the wireless communication device may apply these embodiments related to the initial value setting of the counter to only the channel access of Type A1. Through these embodiments related to the initial value setting of the counter, the wireless communication device may efficiently use a plurality of channels or a plurality of carriers.

As described above, in the initial value setting step of the counter, the wireless communication device may adjust the CW value. Specifically, the wireless communication device may adjust the CW value based on the channel state. In a specific embodiment, the wireless communication device may adjust the CW value based on the NACK ratio of the HARQ-ACK value. For example, when the NACK ratio of the HARQ-ACK value is equal to or greater than a certain reference value, the wireless communication device may increase the CW value. At this time, the predetermined reference value may be 80%. Specifically, the wireless communication device may adjust the CW value according to the following procedure.

1) The wireless communication device sets the CW value $CW_p$ according to the channel access priority class of the data channel to the minimum CW value $CW_{min, p}$ ($CW_p = CW_{min, p}$) of the CW corresponding to each channel access priority class. At this time, the channel access priority class is any one of 1 to 4.

2) When 80% or more of the HARQ-ACK value corresponding to the data channel transmission in the reference subframe k is NACK, the wireless communication device increases the $CW_p$ value to the next larger value of the current $CW_p$ value among values allowed for the $CW_p$ value and remains in step 2). When at least 80% of the HARQ-ACK value corresponding to the data channel transmission in the reference subframe K is not a NACK, the wireless communication device goes to step 1).

At this time, the reference subframe k may be the start subframe of the transmission most recently transmitted by the wireless communication device. This is the case where HARQ-ACK feedback is allowed. Also, when $CW_p$ is the maximum CW value $CW_{max,p}$ ($CW_p = CW_{max}, p$) among the CWS corresponding to the respective channel access priority classes, the next larger value of the current $CW_p$ value among the values allowed for the $CW_p$ values is $CW_{max,p}$. In addition, when the CWp is continuously set to $CW_{max,p}$ by a predetermined reference value in step 2), the wireless communication devices may set $CW_p$ to $CW_{min, p}$. At this time, the constant reference value may be any one of integers from 1 to 8. When the data channel to be transmitted by the wireless communication device includes traffic having a different channel access priority class, the wireless communication device may set the CW value based on one of the channel access priority classes of the plurality of channel access priority classes corresponding to the traffic included in the data channel. The one of the channel access priority may be a channel access priority class that is the lowest priority among the plurality of channel access priority classes. In addition, the access priority may be one of a channel access priority class and an LBT priority class. When a wireless communication device obtains a channel access opportunity by setting a CW value based on one of a plurality of channel access priority classes corresponding to a data channel, the wireless communication device may operate according to at least one of the following conditions. For convenience of explanation, the channel access priority class used for channel access opportunity acquisition is referred to as priority X.

The transmission duration used by the wireless communication device during transmission may not be longer than the transmission duration required to transmit buffered traffic with a priority equal to or prior to priority X.

The transmission duration used by the wireless communication device during transmission may not be longer than the $T_{MCOT}$ corresponding to priority X.

After the wireless communication device exhausts all buffered traffic with a priority equal to or prior to priority X, the wireless communication device is possible to transmit traffic with a priority that is not prior to priority X.

In this manner, when the wireless communication device transmits traffic having a plurality of channel access priority classes through one data channel and accesses the channel based on one of the plurality of channel access priority classes, the method of setting the above-described $CW_p$ from $CW_{max,p}$ to $CW_{min,p}$ may be problematic. Specifically, when a wireless communication device transmits traffic corresponding to channel access priority classes 1 to 3, the wireless communication device may access the channel based on channel access priority class 3. At this time, the wireless communication device may set m_p, $CW_{min,p}$, $CW_{max,p}$, and $T_{MCOT}$ according to the channel access priority class 3. When the wireless communication device sets the value of $CW_3$ continuously by using $CW_{max,3}$ as the reference value, the wireless communication device sets $CW_3$ to $CW_{min,3}$. In this case, the wireless communication device does not set the values of $CW_1$ and $CW_2$ to the respective $CW_{min,p}$. This is because the $CW_p$ value is reset only for the channel access priority class used in channel access. Therefore, traffic corresponding to channel access priority class 1 and channel access priority class 2 may be disadvantageous.

Accordingly, when a wireless communication device accesses a channel for data channel transmission including traffic corresponding to a plurality of channel access priorities, in a case of resetting the $CW_p$ value from $CW_{p,max}$ to $CW_{p,min}$, the wireless communication device may set the $CW_p$ value that is not prior to the channel access priority used in channel access as well as the channel access priority used in channel access to $CW_{p,min}$. In another specific embodiment, when a wireless communication device accesses a channel for data channel transmission including traffic corresponding to a plurality of channel access priorities, in a case of resetting the $CW_p$ value from $CW_{p,max}$ to $CW_{p,min}$, the wireless communication device may set the $CW_p$ value corresponding to the channel access priority used for channel access as well as other channel access priorities of the traffic included in the data channel to $CW_{p,min}$ of the channel access priority, respectively.

Figure 25:
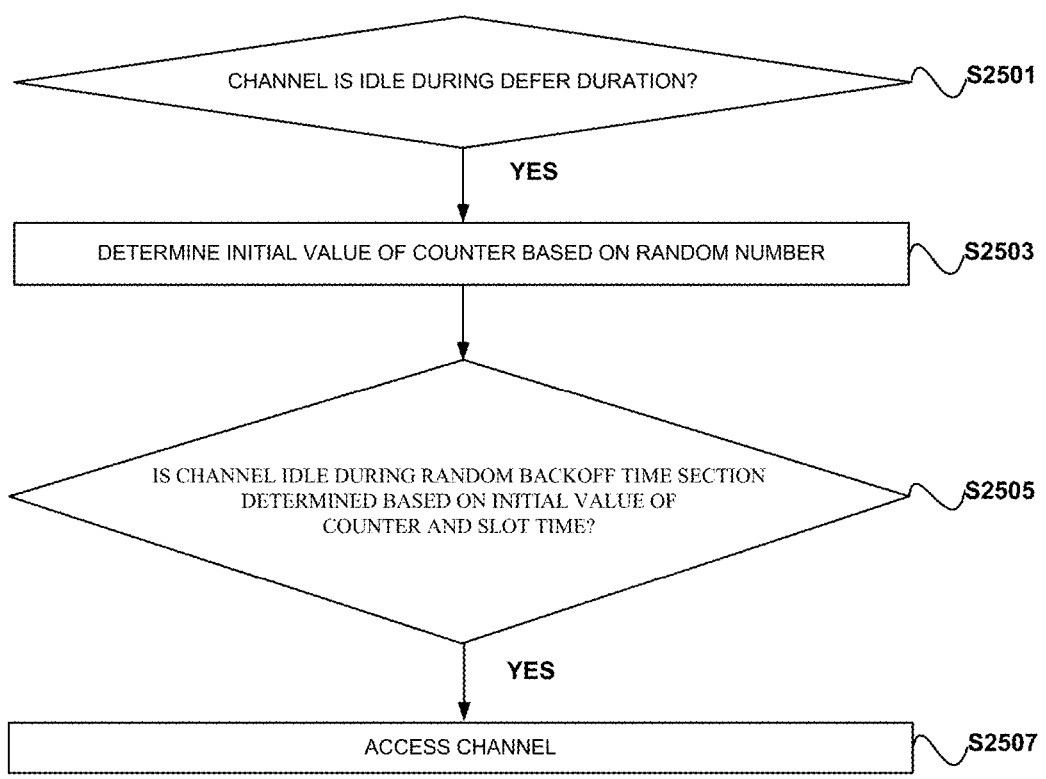
FIG. 25 shows an operation of a wireless communication device according to an embodiment of the present invention.

FIG. 25 shows an operation of a wireless communication device according to an embodiment of the present invention.

As described above, the wireless communication device may access the channel through the following operations. Specifically, the wireless communication device may access the unlicensed band channel through the following operation.

The wireless communication device determines whether the channel is idle during the defer duration (S2501). At this time, the defer duration may be determined based on the access priority order of the traffic included in the data channel to be transmitted through the channel access. Specifically, the priority may be any one of the channel access priority class and the LBT priority class described above.

The wireless communication device determines the initial value of the counter based on the random number (S2503). At this time, the random number may be uniformly distributed within the contention window CW set by the wireless communication device. The wireless communication device may set the CW according to the embodiments described above. Specifically, when the data channel to be transmitted through the channel access includes traffic having a different access priority, the wireless communication device may set a CW value based on one of a plurality of access priorities corresponding to traffic included in the data channel. The one of the priorities may be an access priority that is the lowest priority among the plurality of access priorities. In addition, when a wireless communication device accesses a channel for data channel transmission including traffic corresponding to a plurality of channel access priorities, in a case of resetting the $CW_p$ value from $CW_{p,max}$ to $CW_{p,min}$, the wireless communication device may also set the $CW_p$ value that is not prior to the channel access priority used in channel access as well as the channel access priority used in channel access to $CW_{p,min}$. In another specific embodiment, when a wireless communication device accesses a channel for data channel transmission including traffic corresponding to a plurality of channel access priorities, in a case of resetting the $CW_p$ value from $CW_{p,max}$ to $CW_{p,min}$, the wireless communication device may set the $CW_p$ value corresponding to the channel access priority used for channel access as well as other channel access priorities of the traffic included in the data channel set to $CW_{p,min}$ of the channel access priority, respectively.

The wireless communication device may set a number greater than the random number to the initial value of the counter. Specifically, the wireless communication device may set the initial value of the counter to a value larger by 1 than the obtained random number. For example, in step 1) of the counter value setting procedure described above, the wireless communication device may set $N=N_{init}+1$ and go to step 2). The specific base station may set the initial value of the counter according to the embodiments described with reference to FIG. 24 and the following.

The wireless communication device determines whether the channel is idle during a random backoff time interval determined based on the initial value of the counter and the slot duration (S2505). When the corresponding channel is idle during the random backoff time interval, the wireless communication device accesses the corresponding channel (S2507). At this time, the slot duration may represent a predetermined time unit as described above. Specifically, the wireless communication device may determine whether the channel is idle during slot durations by the number of the initial values of the counter.

At this time, the wireless communication device may selectively reduce the counter value by 1. Specifically, the wireless communication device may determine whether the corresponding channel is idle during one slot duration without reducing the counter value by 1. In a specific embodiment, the wireless communication device may perform the self-deferral operation described with reference to FIG. 16. Through this, the wireless communication device may increase the transmission efficiency during transmission using multi-carriers.

When the wireless communication device determines to decrease the counter in the random backoff time interval, the wireless communication device may reduce the counter value by 1 and perform a counter decrementing operation to determine whether the channel is idle during one slot duration. When the channel is idle during one slot duration, the wireless communication device may determine whether the counter value is 0. At this time, when the counter value is 0, the wireless communication device accesses the corresponding channel. Also, when the counter value is not 0, the wireless communication device repeats the counter decrement operation until the counter value is 0 in a case where the wireless communication device determines to decrease the counter. Specifically, the wireless communication device may set the counter value according to the counter value setting procedure of the above-described embodiments.

In particular, when the initial value of the counter is 0, the wireless communication device may access the corresponding channel immediately after the defer duration. Specifically, after the defer duration, the wireless communication device may access the channel without sensing that the channel is idle during one slot duration. In a specific embodiment, the wireless communication device may determine whether the initial value of the counter is 0 at the end of the defer duration. When the initial value of the counter is 0, the wireless communication device may access the channel. The operation of the wireless communication device in the counter setting procedure after the specific defer duration may be the same as those of the embodiments described with reference to FIG. 17 to FIG. 21.

In the counter decrementing operation, when the channel is not idle for one slot duration, the wireless communication device may determine whether the channel is idle during an additional defer duration having the same duration as the defer duration. After the additional defer duration, when the counter value is 0, the wireless communication device may directly access the channel. Specifically, after the additional defer duration, when the counter value is 0, the wireless communication device may access the corresponding channel without sensing that the corresponding channel is idle during one slot time. In a specific embodiment, when the corresponding channel is idle during an additional defer duration, the wireless communication device may determine whether the value of the counter is 0 at the end of the additional defer duration. When the value of the counter is 0, the wireless communication device may access the channel. The operation of the wireless communication device in the counter setting procedure after the specific additional defer duration may be the same as those of the embodiments described with reference to FIGS. 18, 20, and 21.

Also, the wireless communication device may determine whether the corresponding channel is idle by the slot duration unit in the additional defer duration. Specifically, when a corresponding channel is busy during one of the plurality of slot durations included in the additional defer duration, the wireless communication device may determine whether the channel is idle during the duration of the additional defer duration from the end of the slot duration determined to be busy. In a specific embodiment, the wireless communication device may sense the channel until a non-idle slot duration is sensed in the additional defer duration, or until all slot durations are sensed as idle during the additional defer duration. According to a specific embodiment, in the above-described counter value setting procedure, in the additional defer duration steps 5) and 6), the wireless communication device may operate as follows. The wireless communication device may sense whether the corresponding channel is busy during a slot duration of the plurality of slot durations included in the additional defer duration and whether the corresponding channel is idle during all slot durations included in the additional defer duration. Specifically, when the corresponding channel is busy during a slot duration of the additional defer duration, the wireless communication device proceeds to step 6) when the wireless communication device determines that the channel is busy. At this time, the wireless communication device repeats the operation of step 5) again. Also, when the channel is idle during all slot durations included in the additional defer duration, the wireless communication device goes to step 6) at the end of the corresponding defer duration. At this time, the wireless communication device goes to step 2). In a specific embodiment, the base station may determine whether the channel is idle during an additional defer duration according to the embodiments described with reference to FIGS. 22 to 24.

Further, the base station accesses the corresponding channel and starts transmission including the data. At this time, the data may be a data channel. Specifically, the data channel may be either a PDSCH or a PUSCH. Further, the data may be a control channel. Specifically, the control channel may be a PDCCH or an EPDCCH.

As described above, the wireless communication device may be a base station or a user equipment.

In the description of FIGS. 17 to 25, an embodiment of a channel access method of a wireless communication device is described. Although the embodiments of the present invention are described with reference to the drawings of the operation of the base station in FIGS. 17 to 24, these embodiments may be identically applied to the channel access method of the user equipment. Specifically, the embodiment of the channel access method described with reference to FIGS. 17 to 25 may be applied to the unlicensed band channel access method of the user equipment. In addition, the embodiments of the present invention described above may be applied to a channel access method in an unlicensed band and also a different frequency band in which radio resources are used after a contention procedure.

Figure 26:
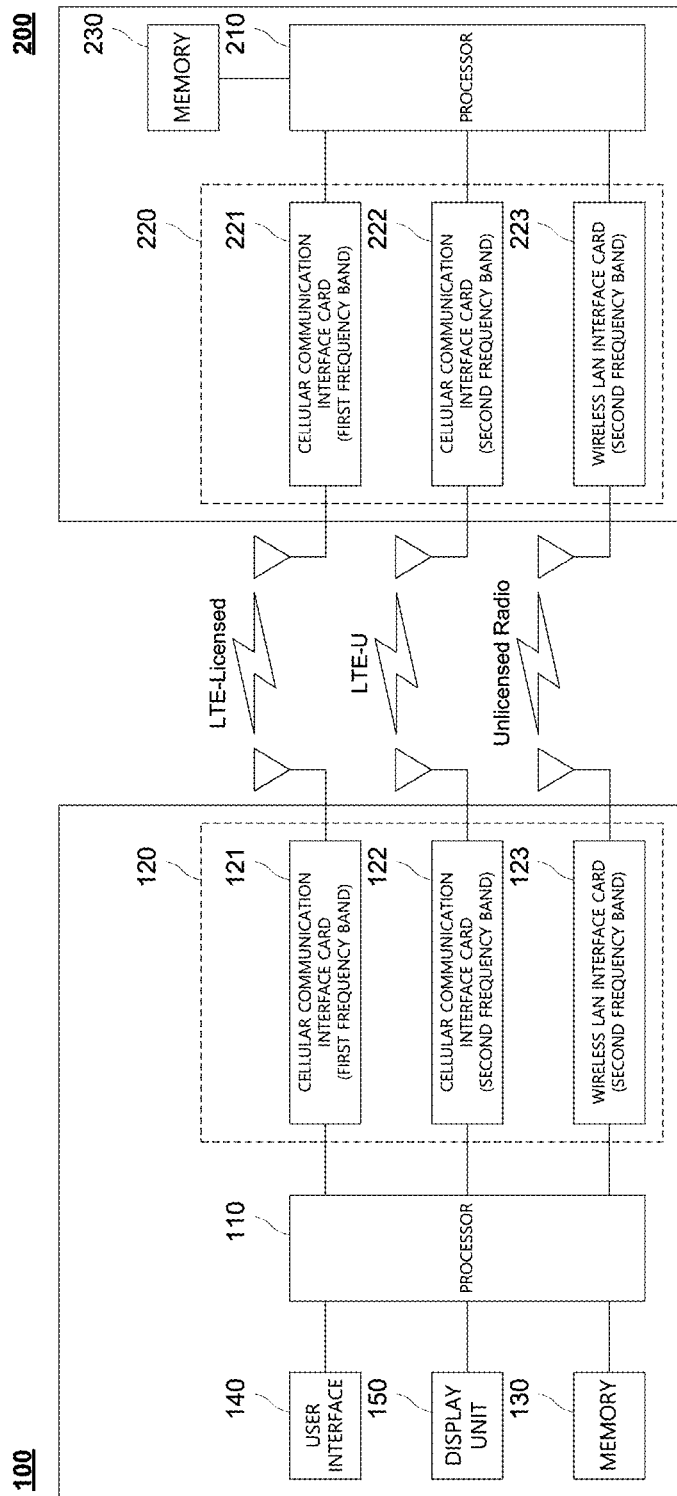
FIG. 26 illustrates a configuration of a user equipment and a base station according to an embodiment of the present invention.

FIG. 26 illustrates a configuration of a user equipment and a base station according to an embodiment of the present invention. The embodiment of the present invention, the user equipment may be implemented by various types of wireless communication devices or computing devices that are guaranteed to be portable and mobility. The user equipment may be referred to as a station (STA), an Mobile Subscriber (MS), or the like. In the embodiment of present invention, the base station may control and manage a cell (eg, macrocell, femtocell, picocell, etc.) corresponding to a service area and perform function such as transmitting signal, designating channel, monitoring channel, self-diagnosis, relay. The base station may be referred to as an evolved NodeB (eNB), an access point (AP), or the like.

Referring to FIG. 26, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may receive/process the downlink signal according to the proposal of the present invention.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In FIG. 26, the communication module 120 is illustrated as the integrated module, but the respective network interface cards may be independently disposed according to a circuit configuration or a purpose unlike FIG. 26.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data and control channel transmission/reception among the units. For example, the processor 210 may transmit/process the downlink transmission of data and control channel according to the proposal of the present invention. For example, transmissions of data and control channel are performed according to the embodiments of the FIG. 17 to FIG. 22

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In FIG. 26, the communication module 220 is illustrated as the integrated module, but the respective network interface cards may be independently disposed according to the circuit configuration or the purpose unlike FIG. 26.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In FIG. 26, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

The invention claimed is:

1. A base station of a wireless communication system, the base station comprising:
   a communication module; and
   a processor,
   wherein the processor is configured to:
   determine whether a channel is idle during a defer duration,
   when the channel is idle during the defer duration, perform a counter decrementing operation including decrementing a value of a counter by 1 in a random backoff time interval and determining whether the channel is idle during one slot duration, wherein the random backoff time interval is determined based on an initial value of the counter and a slot duration that is a constant time unit, wherein the initial value of the counter is determined based on a random number,
   determine whether the channel is idle during an additional defer duration having the same duration as the defer duration when the channel is not idle during the one slot duration,
   when the channel is busy during any one of a plurality of slot durations included in the additional defer duration, determine whether the channel is idle during the additional defer duration from an end of the slot duration determined to be busy,
   repeat the counter decrementing operation until the value of the counter reaches 0 when the value of the counter is not 0, and perform a transmission when the value of the counter is 0,
wherein the random number is obtained with a uniform probability within a contention window that is an integer set by the base station.

2. The base station of claim 1, wherein when the initial value of the counter is 0, the processor is configured to access the channel without sensing whether the channel is idle during the one slot duration after the defer duration.

3. The base station of claim 2, wherein the processor is configured to determine whether the initial value of the counter is 0 at an end of the defer duration, and access the channel when the initial value of the counter is 0.

4. The base station of claim 1, wherein the processor is configured to perform the transmission without sensing whether the channel is idle during the one slot duration when the value of the counter is 0 at an end of the additional defer duration.

5. The base station of claim 1, wherein the processor is configured to selectively decrement the value of the counter by 1 during the counter decrementing operation.

6. The base station of claim 1, wherein the processor is configured to determine the initial value of the counter to be a value larger than the random number.

7. The base station of claim 6, wherein the processor is configured to determine the initial value of the counter to be a value larger by 1 than the random number.

8. The base station of claim 1, wherein the defer duration is determined based on a channel access priority class of traffic included in a data channel to be transmitted through the transmission.

9. An operating method of a wireless communication system, the method comprising:
   determining whether a channel is idle during a defer duration,
   when the channel is idle during the defer duration, performing a counter decrementing operation including decrementing a value of a counter by 1 in a random backoff time interval and determining whether the channel is idle during one slot duration, wherein the random backoff time interval is determined based on an initial value of the counter and a slot duration that is a constant time unit, wherein the initial value of the counter is determined based on a random number,
   determining whether the channel is idle during an additional defer duration having the same duration as the defer duration when the channel is not idle during the one slot duration,
   when the channel is busy during any one of a plurality of slot durations included in the additional defer duration, determining whether the channel is idle during the additional defer duration from an end of the slot duration determined to be busy,
   repeating the counter decrementing operation until the value of the counter reaches 0 when the value of the counter is not 0, and
   performing a transmission when the value of the counter is 0,
   wherein the random number is obtained with a uniform probability within a contention window that is an integer set by the base station.

10. A user equipment of a wireless communication system, the user equipment comprising:
    a communication module; and
    a processor,
    wherein the processor is configured to:
    determine whether a channel is idle during a defer duration,
    when the channel is idle during the defer duration, perform a counter decrementing operation including decrementing a value of a counter by 1 in a random backoff time interval and determining whether the channel is idle during one slot duration, wherein the random backoff time interval is determined based on an initial value of the counter and a slot duration that is a constant time unit, wherein the initial value of the counter is determined based on a random number,
    determine whether the channel is idle during an additional defer duration having the same duration as the defer duration when the channel is not idle during the one slot duration,
    when the channel is busy during any one of a plurality of slot durations included in the additional defer duration, determine whether the channel is idle during the additional defer duration from an end of the slot duration determined to be busy,
    repeat the counter decrementing operation until the value of the counter reaches 0 when the value of the counter is not 0, and
    perform a transmission when the value of the counter is 0,
    wherein the random number is obtained with a uniform probability within a contention window that is an integer set by the user equipment.

11. The user equipment of claim 10, wherein when the initial value of the counter is 0, the processor is configured to perform the transmission without sensing whether the channel is idle during the one slot duration after the defer duration.

12. The user equipment of claim 10, wherein the processor is configured to perform the transmission without sensing whether the channel is idle during the one slot duration when the value of the counter is 0 at an end of the additional defer duration.

* * * * *